(12) United States Patent
Liu et al.

(10) Patent No.: US 12,107,787 B2
(45) Date of Patent: Oct. 1, 2024

(54) REFERENCE SIGNAL SENDING METHOD AND APPARATUS

(71) Applicant: HUAWEI TECHNOLOGIES CO., LTD., Guangdong (CN)

(72) Inventors: Fengwei Liu, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 300 days.

(21) Appl. No.: 17/506,877

(22) Filed: Oct. 21, 2021

(65) Prior Publication Data

US 2022/0038238 A1 Feb. 3, 2022

Related U.S. Application Data

(63) Continuation of application No. PCT/CN2020/083927, filed on Apr. 9, 2020.

(30) Foreign Application Priority Data

Apr. 25, 2019 (CN) .................... 201910340520.X

(51) Int. Cl.
*H04L 5/00* (2006.01)
*H04L 27/26* (2006.01)

(52) U.S. Cl.
CPC ........ *H04L 5/0048* (2013.01); *H04L 27/2613* (2013.01); *H04L 5/001* (2013.01)

(58) Field of Classification Search
None
See application file for complete search history.

(56) References Cited

U.S. PATENT DOCUMENTS

| 10,243,639 | B2 | 3/2019 | Kim et al. | |
| 2005/0094711 | A1* | 5/2005 | Miller | H04J 13/10 375/305 |
| 2014/0029696 | A1* | 1/2014 | Yoon | H04L 5/0026 375/299 |

FOREIGN PATENT DOCUMENTS

| CN | 101447962 A | 6/2009 | |
| CN | 102026219 A | 4/2011 | |
| CN | 102142916 A | 8/2011 | |
| CN | 109219134 A | 1/2019 | |
| WO | 2010011056 A2 | 1/2010 | |
| WO | WO-2015190357 A1 * | 12/2015 | ............... H04B 7/04 |
| WO | 2018000904 A1 | 1/2018 | |
| WO | 2018113901 A1 | 6/2018 | |

(Continued)

OTHER PUBLICATIONS

CN 107306177 B Method for Transmitting Data, User Equipment and Network Side Equipment, Nov. 10, 2023, Hai-Bao Ren (Year: 2023).*

(Continued)

*Primary Examiner* — Gerald A Smarth
(74) *Attorney, Agent, or Firm* — Fish & Richardson P.C.

(57) ABSTRACT

Example reference signal sending and receiving methods and apparatus are described. One example method includes generating a first reference signal based on a first sequence and generating a second reference signal based on a second sequence by a first device, where the first sequence and the second sequence are complementary sequences. The first device sends the first reference signal and the second reference signal by using a same antenna port and a same resource.

19 Claims, 11 Drawing Sheets

Symbol carrying a reference signal

Symbol carrying data

(56) References Cited

FOREIGN PATENT DOCUMENTS

WO    WO-2018175709 A1 * 9/2018 ......... H04L 27/2613

OTHER PUBLICATIONS

Office Action issued in Chinese Application No. 201910340520.X on Apr. 20, 2021, 21 pages (with English translation).
PCT International Search Report and Written Opinion issued in International Application No. PCT/CN2020/083927 on Jul. 10, 2020, 15 pages (with English translation).
ZTE, ZTE Microelectronics, "NR-PBCH Design," 3GPP TSG RAN WG1 Meeting #88, R1-1701577, Athens, Greece Feb. 13-17, 2017, 11 pages.
Ericsson, "Feature lead summary of low PAPR RS," 3GPP TSG RAN WG1 Meeting Ad-Hoc 1901, R1-1901293, Taipei, Taiwan, Jan. 21-25, 2019, 21 pages.
Extended European Search Report issued in European Application No. 20796058.4 on Apr. 25, 2022, 7 pages.
Intel Corporation, "Low PAPR Reference Signals," 3GPP TSG RAN WG1 Ad-Hoc Meeting 1901, R1-1900505, Taipei, Taiwan, Jan. 21-25, 2019, 28 pages.
EP Communication Pursuant to Article 94(3) EPC in European Appln No. 20796058.4, dated Feb. 14, 2024, 5 pages.

* cited by examiner

Subcarrier carrying no reference signal
Subcarrier carrying a reference signal

☐ Subcarrier carrying no reference signal

▨ Subcarrier carrying a reference signal

☐ Subcarrier carrying no reference signal

▨ Subcarrier carrying a reference signal

Padding sequence

Frequency domain configuration of a reference signal on an antenna port 0

Frequency domain configuration of a reference signal on an antenna port 1

Frequency domain configuration of a reference signal on an antenna port 2

Subcarrier carrying no reference signal

Subcarrier carrying a reference signal

REFERENCE SIGNAL SENDING METHOD AND APPARATUS

CROSS-REFERENCE TO RELATED APPLICATIONS

This application is a continuation of International Application No. PCT/CN2020/083927, filed on Apr. 9, 2020, which claims priority to Chinese Patent Application No. 201910340520.X, filed on Apr. 25, 2019. The disclosures of the aforementioned applications are hereby incorporated by reference in their entireties.

TECHNICAL FIELD

Embodiments of this application relate to the communication field, and more specifically, to a reference signal sending method and apparatus, a reference signal receiving method and apparatus, and a communication device.

BACKGROUND

Currently, a technology is known, where in the technology, to reduce a peak to average power ratio (PAPR) of a reference signal, a sequence of the reference signal may be generated in time domain for modulation.

In the technology, the sequence of the reference signal is generated in time domain. Therefore, a case in which the sequence has a non-constant modulus property in frequency domain exists. Consequently, flatness of the reference signal in frequency domain decreases, and performance of the reference signal is affected.

SUMMARY

This application provides a reference signal sending method and apparatus, a reference signal receiving method and apparatus, and a communication device, to improve flatness of a reference signal in frequency domain, and further improve performance of the reference signal.

According to a first aspect, a reference signal sending method is provided, and includes: A first device generates a first reference signal based on a first sequence, and generates a second reference signal based on a second sequence, where the first sequence and the second sequence are complementary sequences. The first device sends the first reference signal and the second reference signal by using a same antenna port and a same resource.

According to the solution provided in this application, two reference signals are generated based on the first sequence and the second sequence that are complementary sequences to each other, and the two reference signals are sent by using the same antenna port and the same resource, so that flatness of the reference signals in frequency domain can be improved, and performance of the reference signals can be further improved.

Optionally, the first device is a terminal device. To be specific, the first reference signal and the second reference signal may be reference signals used in uplink transmission.

Alternatively, the first device is an access device. To be specific, the first reference signal and the second reference signal may be reference signals used in downlink transmission.

Optionally, the first sequence is a symbol sequence generated after time domain modulation is performed on a first original sequence.

Optionally, the second sequence is a symbol sequence generated after time domain modulation is performed on a second original sequence.

The first original sequence and the second original sequence are complementary sequences.

Optionally, the time domain modulation includes modulation based on a discrete Fourier transform spread orthogonal frequency division multiplexing (DFT-s-OFDM) waveform.

Optionally, the time domain modulation includes pi/2-binary phase shift keying (pi/2-BPSK) modulation.

Optionally, the first original sequence and the second original sequence include Golay sequences or Golay complementary sequences.

Optionally, the first original sequence includes [1, 1, 1, 1, −1, 1, −1, −1, −1, 1, 1, −1, −1, 1, 1, −1, 1, −1, −1, 1].

The second original sequence includes [1, 1, 1, 1, −1, 1, 1, 1, 1, −1, −1, −1, 1, −1, 1, −1, 1, 1, −1].

Optionally, that a first device generates a first reference signal based on a first sequence, and generates a second reference signal based on a second sequence includes: The first device performs a fast Fourier transform (FFT) or a discrete Fourier transform (DFT) on the first sequence to obtain a first frequency domain sequence, and generates the first reference signal based on the first frequency domain sequence. The first device performs the FFT or the DFT on the second sequence to obtain a second frequency domain sequence, and generates the second reference signal based on the second frequency domain sequence.

That "the first original sequence and the second original sequence are complementary sequences" may be understood as that the first frequency domain sequence FA and the second frequency domain sequence FB meet the following condition: each element in $|FA|^2 + |FB|^2$ is a constant.

For example, elements in $|FA|^2 + |FB|^2$ are the same (or equal).

Optionally, the same resource includes a same subcarrier set.

Specifically, that "the first device sends the first reference signal and the second reference signal by using a same antenna port and a same resource" may be understood as that the first device sends the first reference signal and the second reference signal by using the same subcarrier set and the same antenna port.

That is, in this application, a subcarrier set carrying the first reference signal is the same as a subcarrier set carrying the second reference signal.

Alternatively, an index number (or a location) of a subcarrier carrying the first reference signal is the same as an index number (or a location) of a subcarrier carrying the second reference signal.

Optionally, the same resource includes a same time unit.

Specifically, that "the first device sends the first reference signal and the second reference signal by using a same antenna port and a same resource" may be understood as that the first device sends the first reference signal and the second reference signal by using the same time unit and the same antenna port.

That is, a symbol (denoted as a first symbol) carrying the first reference signal and a symbol (denoted as a second symbol) carrying the second reference signal are located in the same time unit.

In this application, a time unit may include a slot, a mini-slot, or a symbol set.

Optionally, the time unit includes at least two symbols, and the symbol carrying the first reference signal and the symbol carrying the second reference signal are consecutive.

That is, the first symbol and the second symbol may be consecutive.

Optionally, a preset quantity of symbols are spaced between the symbol carrying the first reference signal and the symbol carrying the second reference signal.

That is, the first symbol and the second symbol may be non-consecutive.

Optionally, the first reference signal and the second reference signal are reference signals used to demodulate data.

For example, the first reference signal and the second reference signal may include a demodulation reference signal (DMRS).

Optionally, a length of the symbol carrying the first reference signal is ½ of a length of a symbol carrying the data.

Optionally, a length of the symbol carrying the second reference signal is ½ of the length of the symbol carrying the data.

Specifically, if a size of a subcarrier spacing of a data channel (for example, a PUSCH (Physical Uplink Shared Channel) or a PDSCH (Physical Downlink Shared Channel)) is configured as a first subcarrier spacing (SCS), denoted as an SCS0, a size of a subcarrier spacing between the first reference signal and the second reference signal is 2×SCS0. Therefore, that the lengths of the symbols carrying the first reference signal and the second reference signal are ½ of the length of the symbol carrying the data can be easily implemented in time domain.

It should be understood that the length of the symbol herein may include a CP, or may not include a CP.

According to the solution provided in this application, an increase in time-frequency resources occupied by a reference signal caused by an increase in symbols occupied by the reference signal can be avoided, so that time-frequency resource overheads can be reduced, and practicality of this application is further improved.

Optionally, the first sequence includes a first subsequence and a second subsequence, and the second sequence includes a third subsequence and the second subsequence, where the first subsequence and the second subsequence are complementary sequences, and the third subsequence and the second subsequence are complementary sequences; and if the first subsequence is Ta, the third subsequence is −1×Ta.

Therefore, the first sequence and the second sequence can be easily obtained.

Optionally, the second subsequence is located at tails of the first sequence and the second sequence.

Optionally, when the symbol carrying the first reference signal and the symbol carrying the second reference signal are consecutive, one that is of the first reference signal and the second reference signal and that is sent later does not include a cyclic prefix (CP).

Therefore, when multipath resistance performance of the first reference signal and the second reference signal is ensured to not deteriorate, an increase in a length of the CP caused by an increase in reference signals can be avoided, so that practicability of this application is further improved.

Optionally, that the first device sends the first reference signal and the second reference signal by using a same antenna port and a same resource includes: The first device sends the first reference signal and the second reference signal by using the same antenna port, the same resource, and a same beam set.

Optionally, that the first device sends the first reference signal and the second reference signal by using the same antenna port, the same resource, and a same beam set includes: The first device sends the first reference signal and the second reference signal based on a same beam transmit sequence by using the same antenna port, the same resource, and the same beam set.

Therefore, the solution provided in this application can be used for beam switching or beam scanning.

Optionally, a length N of the first sequence satisfies $N=2^a 10^b 26^c$, where a, b, and c are non-negative integers.

A length N of the second sequence satisfies $N=2^a 10^b 26^c$.

Optionally, a proportion of a subcarrier that carries the first reference signal or the second reference signal and that is in one resource block is Q that satisfies: $Q=1/(3\times 2^T)$, where T is a positive integer or zero.

Optionally, the proportion of the subcarrier that carries the first reference signal or the second reference signal and that is in one resource block is ⅓, ⅙, or 1/12.

Optionally, a quantity M of subcarriers spaced between any two adjacent target subcarriers satisfies $M=3\times 2^T-1$, where T is a positive integer or zero. The target subcarrier includes subcarriers that are in one resource block and that carry the first reference signal and the second reference signal.

Therefore, the lengths N of the first sequence and the second sequence can easily meet a requirement of the complementary sequence.

Optionally, a component $\alpha_{m,l_1}^p$ that is of a frequency domain sequence of the first reference signal and that is mapped to a first antenna port, a first subcarrier, and a first symbol satisfies $\alpha_{m,l_1}^p=r(k)$, where r(k) represents a $k^{th}$ element in the frequency domain sequence, $k\in[0, K-1]$, K represents the length of the first sequence, p represents a port number of the first antenna port, m represents an index of the first subcarrier, $l_1$ represents an index of the first symbol, m=k/D+C, $C\in[0, 2]$, and D represents a frequency domain density of the first reference signal.

Similarly, a component $\alpha_{m,l_2}^p$ that is of a frequency domain sequence of the second reference signal and that is mapped to the first antenna port, the first subcarrier, and a second symbol satisfies $\alpha_{m,l_2}^p$ r(k), where r(k) represents a $k^{th}$ element in the frequency domain sequence, $k\in[0, K-1]$, K represents the length of the second sequence, p represents a port number of the first antenna port, m represents an index of the first subcarrier, $l_2$ represents an index of the second symbol, m=k/D+C, $C\in[0, 2]$, and D represents a frequency domain density of the second reference signal.

Optionally, that a first device generates a first reference signal based on a first sequence, and generates a second reference signal based on a second sequence, where the first sequence and the second sequence are complementary sequences includes: The first device generates the first reference signal based on the first sequence and a padding sequence, and generates the second reference signal based on the second sequence and the padding sequence.

Optionally, quantities of subcarriers occupied by the first reference signal and the second reference signal are N, the lengths of the first sequence and the second sequence are K, a length of the padding sequence is Y, and N=Y+K.

Therefore, the lengths K of the first sequence and the second sequence do not need to satisfy $K=2^a 10^b 26^c$, so that practicability of this application is further improved.

Optionally, the padding sequence may be a sequence of padding symbols obtained after time domain modulation, for example, pi/2-BPSK modulation, is performed on preset padding bits.

For example, the padding bits may include "0"s of a specified quantity.

Alternatively, the padding bits may include "1"s of a specified quantity.

Alternatively, the padding bits may include random bits of a specified quantity.

Alternatively, the padding bits may be encoded data bits of a specified quantity.

It should be noted that if padding occurs before modulation, the padding sequence may be bits.

If padding occurs after modulation, the padding sequence may be symbols obtained by modulating the foregoing specified bit sequence.

Optionally, the first reference signal may include at least one of the following reference signals: a DMRS, a channel state information reference signal (CSI-RS), a sounding reference signal (SRS), or a secondary synchronization signal (SSS).

Optionally, the second reference signal may include at least one of the following reference signals: a DMRS, a CSI-RS, an SRS, or an SSS.

According to a second aspect, a reference signal sending method is provided, and includes: A second device receives a first reference signal and a second reference signal by using a same antenna port and a same resource. The first reference signal is a reference signal generated based on a first sequence, and the second reference signal is a reference signal generated based on a second sequence, where the first sequence and the second sequence are complementary sequences.

According to the solution provided in this application, two reference signals are generated based on the first sequence and the second sequence that are complementary sequences to each other, and the two reference signals are sent by using the same antenna port and the same resource, so that flatness of the reference signals in frequency domain can be improved, and performance of the reference signals can be further improved.

Optionally, the second device is an access device. To be specific, the first reference signal and the second reference signal may be reference signals used in uplink transmission.

Alternatively, the second device is a terminal device. To be specific, the first reference signal and the second reference signal may be reference signals used in downlink transmission.

Optionally, the first reference signal is a reference signal generated based on a first frequency domain sequence, and the first frequency domain sequence is a frequency domain sequence obtained by performing an FFT or a DFT on the first sequence.

The second reference signal is a reference signal generated based on a second frequency domain sequence, and the second frequency domain sequence is a frequency domain sequence obtained by performing the FFT or the DFT on the second sequence.

Optionally, the same resource includes a same subcarrier set.

Specifically, that "a second device receives a first reference signal and a second reference signal by using a same antenna port and a same resource" may be understood as that the second device receives the first reference signal and the second reference signal by using the same subcarrier set and the same antenna port.

That is, in this application, a subcarrier set carrying the first reference signal is the same as a subcarrier set carrying the second reference signal.

Alternatively, an index number (or a location) of a subcarrier carrying the first reference signal is the same as an index number (or a location) of a subcarrier carrying the second reference signal.

Optionally, the same resource includes a same time unit.

Specifically, that "a second device receives a first reference signal and a second reference signal by using a same antenna port and a same resource" may be understood as that the second device receives the first reference signal and the second reference signal by using the same time unit and the same antenna port.

That is, a symbol (denoted as a first symbol) carrying the first reference signal and a symbol (denoted as a second symbol) carrying the second reference signal are located in the same time unit.

In this application, a time unit may include a slot, a mini-slot, or a symbol set.

Optionally, the time unit includes at least two symbols, and the symbol carrying the first reference signal and the symbol carrying the second reference signal are consecutive.

That is, the first symbol and the second symbol may be consecutive.

Optionally, a preset quantity of symbols are spaced between the symbol carrying the first reference signal and the symbol carrying the second reference signal.

That is, the first symbol and the second symbol may be non-consecutive.

Optionally, the first reference signal and the second reference signal are reference signals used to demodulate data.

For example, the first reference signal and the second reference signal may include a DMRS.

Optionally, a length of the symbol carrying the first reference signal is ½ of a length of a symbol carrying the data.

Optionally, a length of the symbol carrying the second reference signal is ½ of the length of the symbol carrying the data.

According to the solution provided in this application, an increase in time-frequency resources occupied by a reference signal caused by an increase in symbols occupied by the reference signal can be avoided, so that time-frequency resource overheads can be reduced, and practicality of this application is further improved.

Optionally, the first sequence includes a first subsequence and a second subsequence, and the second sequence includes a third subsequence and the second subsequence, where the first subsequence and the second subsequence are complementary sequences, and the third subsequence and the second subsequence are complementary sequences; and if the first subsequence is Ta, the third subsequence is −1×Ta.

Therefore, the first sequence and the second sequence can be easily obtained.

Optionally, the second subsequence is located at tails of the first sequence and the second sequence.

Optionally, when the symbol carrying the first reference signal and the symbol carrying the second reference signal are consecutive, one that is of the first reference signal and the second reference signal and that is sent later does not include a cyclic prefix (CP).

Therefore, when multipath resistance performance of the first reference signal and the second reference signal is ensured to not deteriorate, an increase in a length of the CP caused by an increase in reference signals can be avoided, so that practicability of this application is further improved.

Optionally, that the second device receives the first reference signal and the second reference signal by using a same antenna port and a same resource includes: The second device receives the first reference signal and the second reference signal by using the same antenna port, the same resource, and a same beam set.

Optionally, that the second device receives the first reference signal and the second reference signal by using the same antenna port, the same resource, and a same beam set includes: The second device receives the first reference signal and the second reference signal based on a same beam transmit sequence by using the same antenna port, the same resource, and the same beam set.

Therefore, the solution provided in this application can be used for beam switching or beam scanning.

Optionally, a length K of the first sequence satisfies $K=2^a 10^b 26^c$, where a, b, and c are non-negative integers.

Similarly, a length K of the second sequence satisfies $K=2^a 10^b 26^c$.

Optionally, a quantity M of subcarriers spaced between any two adjacent target subcarriers satisfies $M=333 \times 2^T - 1$, where T is a positive integer or zero. The target subcarrier includes subcarriers that are in one resource block and that carry the first reference signal and the second reference signal.

Therefore, the lengths K of the first sequence and the second sequence can easily meet a requirement of the complementary sequence.

Optionally, a component $\alpha_{m,l_1}^p$ that is of a frequency domain sequence of the first reference signal and that is mapped to a first antenna port, a first subcarrier, and a first symbol satisfies $\alpha_{m,l_1}^p = r(k)$, where r(k) represents a $k^{th}$ element in the frequency domain sequence, $k \in [0, K-1]$, K represents the length of the first sequence, p represents a port number of the first antenna port, m represents an index of the first subcarrier, $l_1$ represents an index of the first symbol, m=k/D+C, $C \in [0, 2]$, and D represents a frequency domain density of the first reference signal.

Similarly, a component $\alpha_{m,l_2}^p$ that is of a frequency domain sequence of the second reference signal and that is mapped to the first antenna port, the first subcarrier, and a second symbol satisfies $\alpha_{m,l_2}^p = r(k)$, where r(k) represents a $k^{th}$ element in the frequency domain sequence, $k \in [0, K-1]$, K represents the length of the second sequence, p represents a port number of the first antenna port, m represents an index of the first subcarrier, $l_2$ represents an index of the second symbol, m=k/D+C, $C \in [0, 2]$, and D represents a frequency domain density of the second reference signal.

Optionally, the first reference signal is a reference signal generated based on the first sequence and a padding sequence, and the second reference signal is a reference signal generated by the second device based on the second sequence and the padding sequence.

Optionally, a quantity of a subcarrier occupied by the first reference signal or the second reference signal is N, the lengths of the first sequence and the second sequence are K, a length of the padding sequence is Y, and N=Y+K.

Therefore, the lengths N of the first sequence and the second sequence do not need to satisfy $N=2^a 10^b 26^c$, so that practicability of this application is further improved.

Optionally, the padding sequence may be a sequence of padding symbols obtained after time domain modulation, for example, pi/2-BPSK modulation, is performed on preset padding data.

For example, the padding data may include "0"s of a specified quantity.

Alternatively, the padding data may include "1"s of a specified quantity.

According to a third aspect, a reference signal sending apparatus is provided, and includes: a processing unit, configured to: generate a first reference signal based on a first sequence, and generate a second reference signal based on a second sequence, where the first sequence and the second sequence are complementary sequences; and a transceiver unit, configured to send the first reference signal and the second reference signal by using a same antenna port and a same resource.

According to the solution provided in this application, two reference signals are generated based on the first sequence and the second sequence that are complementary sequences to each other, and the two reference signals are sent by using the same antenna port and the same resource, so that flatness of the reference signals in frequency domain can be improved, and performance of the reference signals can be further improved.

Optionally, the apparatus is configured in or is a terminal device. To be specific, the first reference signal and the second reference signal may be reference signals used in uplink transmission.

Alternatively, the apparatus is configured in or is an access device. To be specific, the first reference signal and the second reference signal may be reference signals used in downlink transmission.

The processing unit is specifically configured to: perform a fast Fourier transform (FFT) or a discrete Fourier transform (DFT) on the first sequence to obtain a first frequency domain sequence, and generate the first reference signal based on the first frequency domain sequence; and perform the FFT or the DFT on the second sequence to obtain a second frequency domain sequence, and generates the second reference signal based on the second frequency domain sequence.

Optionally, the transceiver unit is specifically configured to send the first reference signal and the second reference signal by using the same antenna port, the same resource, and a same beam set.

Optionally, the transceiver unit is specifically configured to send the first reference signal and the second reference signal based on a same beam transmit sequence by using the same antenna port, the same resource, and the same beam set.

Optionally, the processing unit is specifically configured to: generate the first reference signal based on the first sequence and a padding sequence, and generate the second reference signal based on the second sequence and the padding sequence.

Optionally, a quantity of a subcarrier occupied by the first reference signal or the second reference signal is N, the lengths of the first sequence and the second sequence are K, a length of the padding sequence is Y, and N=Y+K.

Therefore, the lengths N of the first sequence and the second sequence do not need to satisfy $N=2^a 10^b 26^c$, so that practicability of this application is further improved.

The units in the apparatus are separately configured to perform the steps of the communication method according to the first aspect and the implementations of the first aspect.

In a design, the apparatus is a communication chip. The communication chip may include an output circuit or interface configured to send information or data, and an input circuit or interface configured to receive information or data.

In another design, the apparatus is a communication device. The communication device may include a transmitter configured to send information or data, and a receiver configured to receive information or data.

According to a fourth aspect, a reference signal sending apparatus is provided, and includes: a transceiver unit, configured to receive a first reference signal and a second reference signal by using a same antenna port and a same resource. The first reference signal is a reference signal generated based on a first sequence, and the second reference signal is a reference signal generated based on a second sequence, where the first sequence and the second sequence are complementary sequences.

According to the solution provided in this application, two reference signals are generated based on the first sequence and the second sequence that are complementary sequences to each other, and the two reference signals are sent by using the same antenna port and the same resource, so that flatness of the reference signals in frequency domain can be improved, and performance of the reference signals can be further improved.

Optionally, the apparatus is configured in or is an access device. To be specific, the first reference signal and the second reference signal may be reference signals used in uplink transmission.

Alternatively, the apparatus is configured in or is a terminal device. To be specific, the first reference signal and the second reference signal may be reference signals used in downlink transmission.

Optionally, the transceiver unit is specifically configured to receive the first reference signal and the second reference signal by using the same antenna port, the same resource, and a same beam set.

Optionally, the transceiver unit is specifically configured to receive the first reference signal and the second reference signal based on a same beam transmit sequence by using the same antenna port, the same resource, and the same beam set.

Therefore, the solution provided in this application can be used for beam switching or beam scanning.

The units in the apparatus are separately configured to perform the steps of the communication method according to the second aspect and the implementations of the second aspect.

In a design, the apparatus is a communication chip. The communication chip may include an output circuit or interface configured to send information or data, and an input circuit or interface configured to receive information or data.

In another design, the apparatus is a communication device. The communication device may include a transmitter configured to send information or data, and a receiver configured to receive information or data.

According to a fifth aspect, a communication device is provided, and includes a processor and a memory. The memory is configured to store a computer program, and the processor is configured to invoke the computer program from the memory and run the computer program, to enable the communication device to perform the communication method according to any one of the first aspect and the second aspect and the implementations thereof.

Optionally, there are one or more processors, and there are one or more memories.

Optionally, the memory may be integrated with the processor, or the memory and the processor are separately disposed.

Optionally, the communication device further includes a transmitter and a receiver.

According to a sixth aspect, a communication system is provided, and includes the communication device provided in the fifth aspect.

In a possible design, the communication system may further include another device interacting with the communication device in the solutions provided in the embodiments of this application.

According to a seventh aspect, a communication system is provided, and includes a first device and a second device.

The first device is configured to perform the method in the implementations of the first aspect, and the second device is configured to perform the method in the implementations of the second aspect.

In a possible design, the communication system may further include another device interacting with the first device or the second device in the solutions provided in the embodiments of this application.

According to an eighth aspect, a computer program product is provided. The computer program product includes a computer program (which may also be referred to as code or an instruction). When the computer program is run, a computer is enabled to perform the method according to any one of the first aspect and the second aspect and the possible implementations thereof.

According to a ninth aspect, a computer-readable medium is provided. The computer-readable medium stores a computer program (which may also be referred to as code or an instruction). When the computer program is run on a computer, the computer is enabled to perform the method in any one of the first aspect and the second aspect and the possible implementations thereof.

According to a tenth aspect, a chip system is provided, and includes a memory and a processor. The memory is configured to store a computer program, and the processor is configured to: invoke the computer program from the memory and run the computer program, to enable a communication device in which the chip system is installed to perform the method in any one of the first aspect and the second aspect and the possible implementations thereof.

The chip system may include an output circuit or interface configured to send information or data, and an input circuit or interface configured to receive information or data.

DESCRIPTION OF EMBODIMENTS

Figure 1:
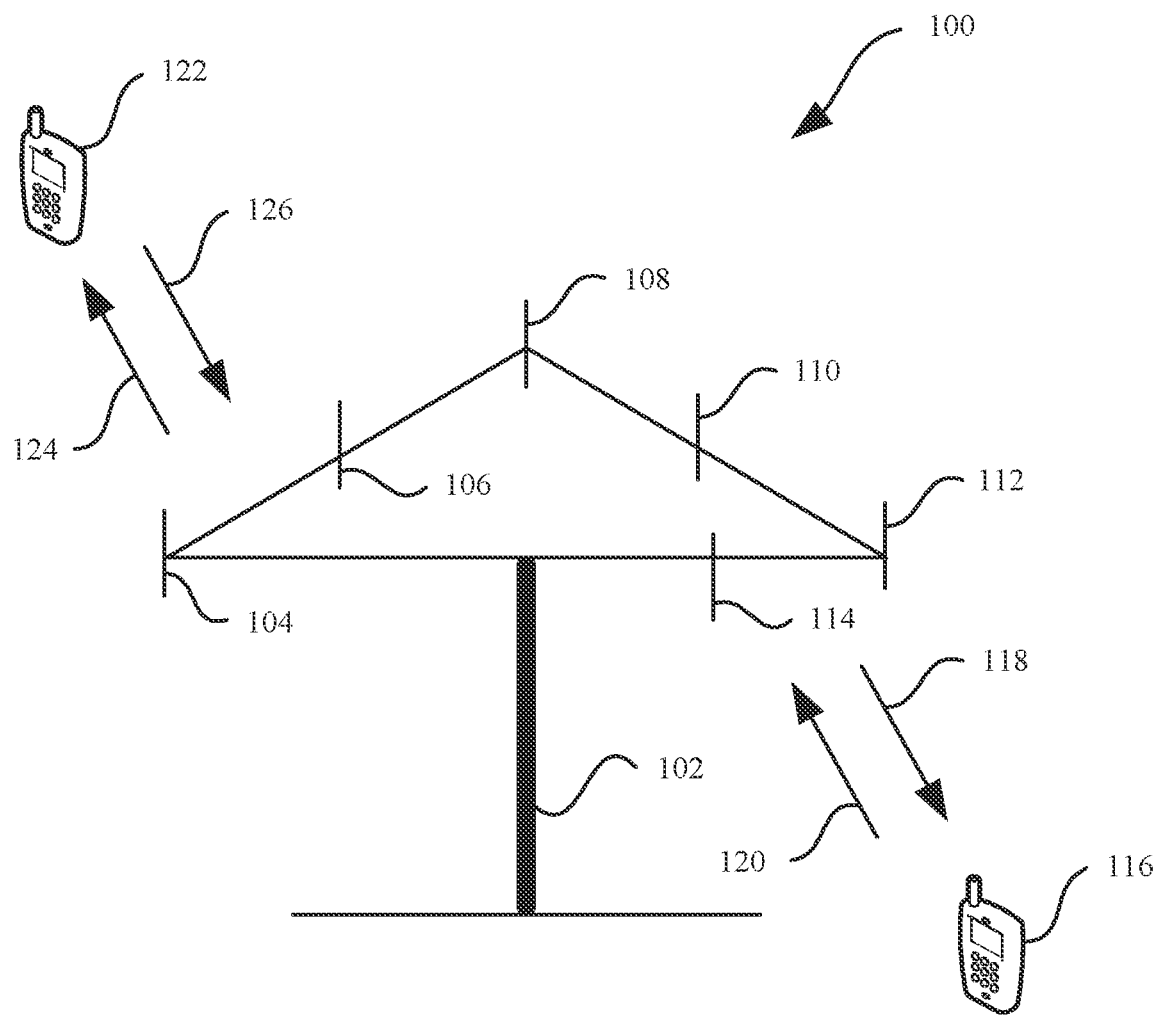
FIG. 1 is a schematic diagram of a structure of an example of a communication system according to this application.

The following describes technical solutions of this application with reference to the accompanying drawings.

The technical solutions in the embodiments of this application may be used in various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) system, a worldwide interoperability for microwave access (WiMAX) communication system, a 5th generation (5G) system, or a new radio (NR) system.

As an example instead of a limitation, a terminal device in the embodiments of this application may also be referred to as user equipment, an access terminal, a subscriber unit, a subscriber station, a mobile station, a remote station, a remote terminal, a mobile device, a user terminal, a terminal, a wireless communication device, a user agent, or a user apparatus. The terminal device may include but is not limited to a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved public land mobile network (PLMN), or the like. This is not limited in the embodiments of this application.

As an example instead of a limitation, the terminal device in the embodiments of this application may alternatively be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. A generalized wearable intelligent device includes a full-featured and large-size device that can implement complete or partial functions without depending on a smartphone, such as a smart watch or a smart glass, and a device that focuses on only one type of application and needs to work with another device such as a smartphone, such as various smart bracelets or smart jewelry for monitoring physical signs.

In addition, in the embodiments of this application, the terminal device may alternatively be a terminal device in an internet of things system, or the terminal device may further include a sensor such as an intelligent printer, a train detector, or a gas station. Main functions of the terminal device include collecting data (for some terminal devices), receiving control information and downlink data of a network device, sending an electromagnetic wave, and transmitting uplink data to the network device.

The network device in the embodiments of this application may be a device configured to communicate with the terminal device. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a 5G network, a network device in a future evolved PLMN network, or the like, or may be an access point (AP) in a WLAN (wireless local-area network), or may be a gNB in a new radio (NR) system. This is not limited in the embodiments of this application.

In addition, in the embodiments of this application, an access network device serves a cell. The terminal device communicates with the access network device on a transmission resource (for example, a frequency domain resource, namely, a spectrum resource) used for the cell. The cell may be a cell corresponding to the access network device (for example, a base station). The cell may belong to a macro base station, or a base station corresponding to a small cell. The small cell herein may include a metro cell, a micro cell, a pico cell, a femto cell, or the like. These small cells have features of small coverage and a low transmit power, and are suitable for providing a high-rate data transmission service.

In addition, a plurality of cells may simultaneously work in a same frequency band on a carrier in the LTE system or the 5G system. In some special scenarios, a concept of the carrier may be considered equivalent to that of the cell. For example, in a carrier aggregation (CA) scenario, both a carrier index of a secondary component carrier and a cell identifier (Cell ID) of a secondary cell that works on the secondary component carrier are carried when the secondary component carrier is configured for UE (user equipment). In this case, the concept of the carrier may be considered equivalent to that of the cell. For example, that the UE accesses a carrier is equivalent to that the LE accesses a cell.

In addition, in this application, the access device may include a gNB, for example, a macro base station, a micro base station, an indoor hotspot, or a relay node, and has functions of the following: sending a radio wave to the terminal device, to implement downlink data transmission and control uplink transmission by sending scheduling information; and receiving a radio wave sent by the terminal device, to receive uplink data transmission.

The foregoing listed functions and specific implementations of the terminal device and the access network device are merely examples for description, and this application is not limited thereto.

In the embodiments of this application, the terminal device or the access device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant communication software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device, the network device, or a functional module that is in the terminal device or the network device and that can invoke and execute the program.

In addition, aspects or features of this application may be implemented as a method, an apparatus or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

It should be noted that in the embodiments of this application, a plurality of applications may be run at the application layer. In this case, an application for performing the communication method in the embodiments of this application and an application configured to control a receive end device to implement an action corresponding to received data may be different applications.

FIG. 1 is a schematic diagram of a system 100 to which a communication method according to an embodiment of this application is applicable. As shown in FIG. 1, the system 100 includes an access network device 102. The access network device 102 may include one or more antennas, for example, antennas 104, 106, 108, 110, 112, and 114. In addition, the access network device 102 may additionally include a transmitter chain and a receiver chain. A person of ordinary skill in the art may understand that both the transmitter chain and the receiver chain may include a plurality of components (such as a processor, a modulator, a multiplexer, a demodulator, and a demultiplexer) related to signal sending and receiving.

The access network device 102 may communicate with a plurality of terminal devices (for example, a terminal device 116 and a terminal device 122). However, it may be understood that the access network device 102 may communicate with any quantity of terminal devices that are similar to the terminal device 116 or the terminal device 122. The terminal devices 116 and 122 may each be, for example, a cellular phone, a smartphone, a portable computer, a handheld communication device, a handheld computing device, a satellite radio apparatus, a global positioning system, a PDA, and/or any other suitable device configured to perform communication in the system 100.

As shown in FIG. 1, the terminal device 116 communicates with the antennas 112 and 114. The antennas 112 and 114 send information to the terminal device 116 over a forward link (which is also referred to as a downlink) 118, and receive information from the terminal device 116 over a reverse link (which is also referred to as an uplink) 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, the forward link 118 and the reverse link 120 may use different frequency bands, and the forward link 124 and the reverse link 126 may use different frequency hands.

For another example, in a time division duplex (TDD) system and a full duplex system, the forward link 118 and the reverse link 120 may use a same frequency hand, and the forward link 124 and the reverse link 126 may use a same frequency band.

Each antenna (or antenna group including a plurality of antennas) and/or area designed for communication arcus referred to as a sector of the access network device 102. For example, an antenna group may be designed to communicate with a terminal device in a sector within coverage of the access network device 102. The access network device may send signals to all terminal devices in the corresponding sector through a single antenna or a multi-antenna transmit diversity. In a process in which the access network device 102 communicates with the terminal devices 116 and 122 respectively over the forward links 118 and 124, a transmit antenna of the access network device 102 may improve signal-to-noise ratios of the forward links 118 and 124 through beamforming. In addition, interference to a mobile device in a neighboring cell when the access network device 102 sends signals through beamforming to the terminal devices 116 and 122 that are randomly scattered in the related coverage is less than that in a manner in which an access network device sends, through a single antenna or a multi-antenna transmit diversity, signals to all terminal devices served by the access network device.

In a given time, the access network device 102, the terminal device 116, or the terminal device 122 may be a wireless communication sending apparatus and/or a wireless communication receiving apparatus. During data sending, the wireless communication sending apparatus may encode data for transmission. Specifically, the wireless communication sending apparatus may obtain (for example, generate, receive from another communication apparatus, or store in a memory) a specific quantity of data bits to be sent to the wireless communication receiving apparatus over a channel. The data bit may be included in a transport block (or a plurality of transport blocks) of the data, and the transport block may be segmented to generate a plurality of code blocks.

In addition, the communication system 100 may be a MIN network, a device-to-device (D2D) network, a machine-to-machine (M2M) network, an IoT network, or another network. FIG. 1 is merely a simplified schematic diagram of an example. The network may further include another access network device not shown in FIG. 1.

In the embodiments of this application, a reference signal and data may be carried by using a time-frequency resource, and the time-frequency resource may include a resource in time domain and a resource in frequency domain.

In time domain, the time-frequency resource may include one or more time units.

A time unit may be a symbol set (including a plurality of symbols), a mini-slot, a slot, or a subframe. Duration of one subframe in time domain may be 1 millisecond (ms). One slot includes seven or 14 symbols. One mini-slot may include at least one symbol (for example, two symbols, four symbols, seven symbols, or any quantity of symbols fewer than or equal to 14 symbols).

In addition, in frequency domain, a basic unit for resource scheduling may be a resource block (RB). For example, one RB may include 12 subcarriers.

A transmission object in the embodiments of this application is described in detail below.

Specifically, the transmission object in the embodiments of this application may be a reference signal (RS), or may be referred to as a pilot signal, and is a known signal that is provided by a transmit device (which may also be referred to as a sending device or a transmit end) for a receiving device for channel estimation, channel measurement, channel sounding, channel demodulation, or the like.

In the embodiments of this application, the reference signal may be used in a physical layer, and does not carry data information from a higher layer. In addition, the reference signal may include a downlink reference signal and an uplink reference signal.

The downlink reference signal includes a downlink cell-specific reference signal (CRS), a downlink UE-specific reference signal (UE-RS), a channel state information reference signal (CSI-RS) used for downlink channel measurement, a downlink group-specific reference signal (GRS), a downlink positioning reference signal (PRS), a downlink beam reference signal (BPS), a downlink beam refinement reference signal (BRRS), a downlink phase compensation reference signal (PCRS), or the like. The downlink UE-RS is also referred to as a downlink demodulation reference signal (DMRS).

The uplink reference signal includes a demodulation reference signal (DMRS) used for uplink demodulation, a sounding reference signal (SRS) used for uplink channel measurement, an uplink PCRS, or the like.

In addition to the reference signal, the transmission object in this application may alternatively be a sequence signal in a sequence signal set with a good correlation characteristic. The good correlation characteristic is that any sequence in the set has a relatively large autocorrelation peak, and any two sequences in the set have relatively small cross-correlation peaks. That is, in the embodiments of this application, the sending device may send a plurality of signals, where at least one signal is a sequence signal with the foregoing good correlation characteristic.

Specifically, correlation means that correlation calculation is performed on one sequence signal and another sequence signal in a same set, to obtain a correlation value through calculation. Therefore, the receiving device can detect, based on the correlation characteristic, whether the sequence signal having the good correlation characteristic exists. That is, a detection mechanism such as a pilot does not need to be used for transmission of a sequence signal having the correlation characteristic. A reference signal (or a pilot signal) may be used as a type of a signal with the good correlation characteristic.

It should be understood that the foregoing listed specific example of the sequence signal is merely an example for description, and this application is not limited thereto. For example, the sequence signal may alternatively be a signal used to carry feedback information (for example, acknowledgment (ACK) information or negative acknowledgment (NACK) information), a resource request signal, or a measurement request signal.

For ease of understanding and description, the following describes a signal transmission process in the embodiments of this application by using a reference signal as an example.

In this application, the reference signal may include but is not limited to a reference signal having the following functions.

1. Used for Data Channel Demodulation

Specifically, a channel over which a signal (for example, a reference signal) is carried in the embodiments of this application may carry modulated data. Therefore, the signal (for example, the reference signal) may be used to demodulate the data.

As an example instead of a limitation, the signal used for channel demodulation may be listed as follows: for example, a demodulation reference signal (DMRS) or a common reference signal (CRS).

In addition, a specific method for and a specific process of "data channel demodulation" in the embodiments of this application may be similar to those in a conventional technology. To avoid repetition, detailed description thereof is omitted herein.

In addition, as an example instead of a limitation, a channel to which the signal (for example, the DMRS) used for data channel demodulation is applicable (or a channel demodulated by using the signal (for example, the DMRS) used for data channel demodulation) may be an uplink channel (for example, a PUSCH), or may be a downlink channel (for example, a PDSCH). This is not particularly limited in this application.

2. Used for Control Channel Demodulation

Specifically, a channel over which a signal (for example, a reference signal) is carried in the embodiments of this application may carry modulated control information. Therefore, the signal (for example, the reference signal) may be used to demodulate the control information.

As an example instead of a limitation, the signal used for channel demodulation may be listed as follows: for example, a DMRS or a CRS.

In addition, a specific method for and a specific process of "control channel demodulation" in the embodiments of this application may be similar to those in a conventional technology. To avoid repetition, detailed description thereof is omitted herein.

In addition, as an example instead of a limitation, a channel to which the signal (for example, the DMRS) used for control channel demodulation is applicable (or a channel demodulated by using the signal (for example, the DMRS) used for control channel demodulation) may be an uplink channel (for example, a PUCCH (Physical Uplink Control Channel)), or may be a downlink channel (for example, a PDCCH (Physical Downlink Control Channel)). This is not particularly limited in this application.

3. Used for Channel State Information Measurement

Specifically, the signal (for example, the reference signal) in the embodiments of this application may be used to perform measurement, for example, channel quality measurement, on a channel over which the signal is carried.

As an example instead of a limitation, the signal used for channel measurement may be listed as follows: for example, a channel state information reference signal (CSI-RS), a sounding reference signal (SRS), or a common reference signal (CRS).

In addition, a specific method for and a specific process of "channel measurement" in the embodiments of this application may be similar to those in a conventional technology. To avoid repetition, detailed description thereof is omitted herein.

In addition, as an example instead of a limitation, a channel to which the signal (for example, the DMRS) used for channel measurement is applicable (or a channel measured by using the signal (for example, the DMRS) used for channel measurement) may be an uplink channel (for example, a PUSCH or a PUCCH), or may be a downlink channel (for example, a PDCCH or a PDSCH). This is not particularly limited in this application.

4. Used for Phase Compensation

Specifically, the signal (for example, the reference signal) in the embodiments of this application may be used for common phase error (CPE) measurement and inter-subcarrier interference (ICI) measurement.

As an example instead of a limitation, the signal used for phase compensation may be listed as follows: for example, a phase compensation reference signal or a channel state information reference signal (CSI-RS).

In addition, a specific method for and a specific process of "phase compensation" in the embodiments of this application may be similar to those in a conventional technology. To avoid repetition, detailed description thereof is omitted herein.

5. Used to Carry Feedback Information

Specifically, the signal (for example, the reference signal) in the embodiments of this application may be used to perform feedback processing, for example, hybrid automatic repeat request (HARQ) processing. In other words, the signal (for example, a first signal and/or a second signal) may be used to carry feedback information, for example, acknowledgment ACK information or NACK information.

6. Used to Carry Resource Request Information

Specifically, the signal (for example, the reference signal) in the embodiments of this application may be used to perform a resource request process. In other words, the signal may be a signal used to carry resource request information (for example, resource scheduling request information). As an example instead of a limitation, the resource request information may be request information for requesting to allocate a time-frequency resource used to transmit data (for example, uplink data or downlink data).

7. Used to Carry Measurement Request Information

Specifically, the signal (for example, the reference signal) in the embodiments of this application may be used to perform a measurement request process. In other words, the signal may be a signal used to carry measurement request information. As an example instead of a limitation, the measurement request information may be request information for requesting to send a downlink measurement reference signal.

8. Used for Automatic Gain Control AGC Adjustment

Specifically, automatic gain control (AGC) is an automatic control method for automatically adjusting a gain of an amplifier circuit with signal strength. Automatic gain control is a type of amplitude limiting output. In the AGC, an effective combination of linear amplification and compression amplification is used to adjust an output signal. When a weak signal is input, a linear amplifier circuit works to ensure strength of the output signal. When an input signal reaches specific strength, a compressor amplifier circuit is started to reduce an output amplitude. That is, an AGC function may be automatically controlling an amplitude of a gain by changing an input/output amplification ratio.

The signal (for example, the reference signal) in the embodiments of this application may be used in an AGC adjustment process, and a usage of and a usage method for the reference signal in the AGC adjustment process may be similar to those in a conventional technology. To avoid repetition, detailed description thereof is omitted herein.

9. Used for Time/Frequency Synchronization

The signal (for example, the reference signal) in the embodiments of this application may be used in time/frequency synchronization, and a usage of and a usage method for the reference signal in a time/frequency synchronization process may be similar to those in a conventional technology. To avoid repetition, detailed description thereof is omitted herein.

10. Used for Radio Resource Management RRM Measurement

Specifically, radio resource management (RRM) is that service quality assurance is provided for wireless user terminals in a network in limited bandwidth. A basic objective is to flexibly allocate and dynamically adjust a radio transmission part and available resources of a network when network traffic is unevenly distributed and channel characteristics fluctuate due to channel weakening and interference, to maximize utilization of a radio spectrum, and prevent network congestion and keep signaling load as small as possible.

The signal (for example, the reference signal) in the embodiments of this application may be used in an RRM measurement process, and a usage of and a usage method for the reference signal in the RRM measurement process may be similar to those in a conventional technology. To avoid repetition, detailed description thereof is omitted herein.

11. Used for Positioning Measurement

The signal (for example, the reference signal) in the embodiments of the present invention may be used in a positioning measurement process, and a usage of and a usage method for the reference signal in the positioning measurement process may be similar to those in a conventional technology. To avoid repetition, detailed description thereof is omitted herein.

It should be understood that the foregoing enumerated functions of the reference signal are merely example descriptions, and this application is not limited thereto. For example, functions of the reference signal may be alternatively used, for example, for beam state information measurement or beam refinement information measurement.

The reference signal in this application is described in detail below.

In this application, in uplink transmission or downlink transmission, to reduce a PAPR, a DFT-s-OFDM waveform may be used.

A reference signal, for example, a MARS, of an existing DFT-s-OFDM waveform is generated based on a quadrature phase shift keying (QPSK) sequence or a Zadoff-chu sequence. PAPRs of reference signals generated by using the two sequences are close to a PAPR of a DFT-s-OFDM waveform with QPSK modulation, that is, greater than a PAPR of a DFT-s-OFDM waveform using pi/2-BPSK modulation. That is, in a conventional technology, when pi/2-BPSK modulation is used for data, the PAPR of the reference signal is greater than a PAPR of the data. Therefore, in the conventional technology, a PAPR of a combined signal of a data signal and a reference signal increases, causing a decrease in a total output power of the combined signal. If power backoff is performed on the reference signal, a decrease in channel estimation accuracy is caused. If power backoff is not performed on the reference signal, because a PAPR of the reference signal is higher, relatively large distortion occurs after the reference signal passes through a power amplifier (PA), and channel estimation performance is also affected.

A possible solution is to generate a reference signal by using a pi/2-BPSK modulated sequence.

However, in this manner, because pi/2-BPSK modulation is performed in time domain, in other words, the pi/2-BPSK modulated sequence is generated in time domain, there is a case in which the sequence has a non-constant modulus property in frequency domain (or is not flat in frequency domain). Consequently, channel estimation performance of the reference signal is affected.

To resolve the foregoing problem, in this application, two reference signals (denoted as a first reference signal and a second reference signal) may be respectively generated based on two sequences (namely, a first sequence and a second sequence) that are complementary sequences to each other, and the two reference signals are sent by using a same resource. Because the first reference signal and the second reference signal are generated based on the complementary sequences, the reference signals may be flat in frequency domain.

The following describes in detail a manner of generating the first sequence and the second sequence.

The first sequence and the second sequence may be sequences generated after time domain modulation is performed on original sequences (for example, data sequences). That is, the sending device may perform time domain modulation, for example, pi/2-BPSK modulation, on a first original sequence (denoted as $b_A$), to generate the first sequence (denoted as $T_A$).

The first original sequence and a second original sequence are complementary sequences (CSs). The complementary sequences may also be referred to as Golay sequences, and the complementary sequences exist in pairs.

In applied mathematics, complementary sequences are a pair of sequences with useful characteristics. In other words, a sum of out-of-phase aperiodic autocorrelation coefficients of two complementary sequences is zero.

In other words, a sum of modulus squares of the two complementary sequences after discrete Fourier transform (DFT) is equal to a constant.

As an example instead of a limitation, the following shows an example of the first original sequence and the second original sequence when K=20.

$b_A$=[1, 1, 1, 1, −1, 1, −1, −1, −1, 1, 1, −1, −1, 1, 1, −1, 1, −1, −1, 1].

$b_B$=[1, 1, 1, 1, −1, 1, 1, 1, 1, 1, −1, −1, −1, 1, −1, 1, −1, 1, 1, −1].

In addition, in this application, for example, pi/2-BPSK modulation may be performed according to the following formula:

$$s_A(k) = b_A(k)\exp\left(-j\frac{\pi}{2}k\right),$$

where $s_A(k)$ is a $k^{th}$ symbol in $T_A$, k∈[0, K−1], K is a length of $T_A$, and j is a complex symbol, that is, $j=\sqrt{-1}$.

In addition, the sending device may perform time domain modulation, for example, pi/2-BPSK modulation, on the second original sequence (denoted as $b_B$), to generate the second sequence (denoted as $T_B$).

For example, pi/2-BPSK modulation may be performed according to the following formula:

$$s_B(k) = b_B(k)\exp\left(-j\frac{\pi}{2}k\right),$$

where $s_B(k)$ is a $k^{th}$ symbol in $T_B$, k∈[0, K−1], K is a length of $T_B$, and j is a complex symbol, that is, $j=\sqrt{-1}$.

It should be understood that the pi/2-BPSK modulation is merely an example. In practice, the pi/2-BPSK modulation may further include another implementation, for example, may further include an additional initial phase.

After obtaining the first sequence and the second sequence as described above, a transmit end device may perform frequency domain conversion on the first sequence to generate a first frequency domain sequence, and the transmit end device may perform frequency domain conversion on the second sequence to generate a second frequency domain sequence. Further, the first reference signal may be generated based on the first frequency domain sequence, and the second reference signal may be generated based on the second frequency domain sequence.

Because the first original sequence and the second original sequence are complementary sequences, the first sequence and the second sequence that are generated after time domain modulation are complementary sequences. Further, the first frequency domain sequence and the second frequency domain sequence that are generated after frequency domain conversion are complementary sequences to each other.

In this application, that the first frequency domain sequence and the second frequency domain sequence are complementary sequences to each other may mean that each element in a sequence consisting of $|F_A|^2+|F_B|^2$ is a constant.

For example, elements in the sequence consisting of $|F_A|^2+|F_B|^2$ are equal. In other words, elements in the sequence consisting of $|F_A|^2+|F_B|^2$ consist of a same constant.

In this application, the first reference signal and the second reference signal that are generated as described above are transmitted by using the same resource.

That the first reference signal and the second reference signal are transmitted by using the same resource may be understood as at least one of the following meanings:

Meaning 1: the transmit end device sends the first reference signal and the second reference signal by using a same antenna port, and a receive end device receives the first reference signal and the second reference signal by using the same antenna port.

Meaning 2: the first reference signal and the second reference signal are carried on a same subcarrier, or the first reference signal and the second reference signal are carried in a same subcarrier set.

Meaning 3: the first reference signal and the second reference signal are carried in different symbols in a same time unit.

The following describes a configuration of a frequency domain resource used to carry a reference signal in this application.

According to a requirement and a property of the complementary sequences, lengths K of the first sequence and the second sequence need to meet the following condition (namely, a condition 1):

$$K=2^1 10^b 26^c, \text{ where } a, b, \text{ and } c \text{ are non-negative integers.}$$

In this application, the first reference signal may be generated based only on the first sequence, and the second reference signal may be generated based only on the second sequence (that is, case 1). Alternatively, the first reference signal may be generated based on the first sequence and a padding sequence, and the second reference signal may be generated based on the second sequence and the padding sequence (that is, case 2).

The following separately describes in detail a relationship between the length of the first sequence and a frequency domain resource used to carry a reference signal in the foregoing two cases.

Case 1

To implement full-bandwidth channel estimation, a length of a sequence used to generate a reference signal needs to be the same as a quantity (denoted as N) of subcarriers occupied by the reference signal in frequency domain.

Therefore, in Case 1, values of the lengths (namely, K) of the first sequence and the second sequence each need to be the same as a value of N.

As described above, usually, one RB includes 12 subcarriers, and the RB is a basic unit for resource scheduling, that is, a quantity of resource blocks scheduled by an access device for a terminal device is a positive integer.

Therefore, a total bandwidth occupied by the reference signal (in other words, a total quantity of subcarriers included in an RB that carries the reference signal) is a multiple of 3.

For example, it is assumed that the access device schedules W RBs for the terminal device, and the total quantity of subcarriers occupied by the reference signal is at most 12 W. Considering comb mapping (the comb mapping is described later), N=D*12 W. D represents a frequency domain density of the reference signal, and is described in detail later.

Because W is a multiple of 3, the lengths K of $T_A$ and $T_B$ are a multiple of 3 (that is, condition 2).

In addition, in this application, a mapping manner between a reference signal and a frequency domain resource may be comb mapping. To be specific, if a subcarrier carrying a reference signal is referred to as a target subcarrier, and a subcarrier carrying no reference signal is referred to as a non-target subcarrier, a specified quantity (where the quantity is denoted as M) of non-target subcarriers may be spaced between any two adjacent target subcarriers.

That is, in this application, on a frequency domain resource scheduled by the access device for the terminal device, not all subcarriers carry a reference signal. That is, the reference signal has a specified "density".

It is assumed that the density of the reference signal is D, and D=B/P.

B represents a quantity of subcarriers that carry the reference signal and that are in the frequency domain resource scheduled by the access device for the terminal device, and P represents a quantity of all subcarriers included in the frequency domain resource scheduled by the access device for the terminal device.

Therefore, to meet the condition 1 and the condition 2, a density of the first reference signal and a density of the second reference signal in this application may be set to meet the following condition:

$$D=1/(3\times 2^T), \text{ where } T \text{ is a positive integer or zero.}$$

It should be noted that, because K=N, to make a total length of a sequence included in the first reference signal on one symbol equal to a total quantity of subcarriers included in a resource block scheduled by the access device for the terminal device, 1/D $T_A$s may be included in a same symbol, or the sequence is repeated 1/D times in time domain.

Similarly, the $T_B$ may be repeated 1/D times in one symbol, or 1/D $T_B$s may be included in a same symbol.

Figure 2:
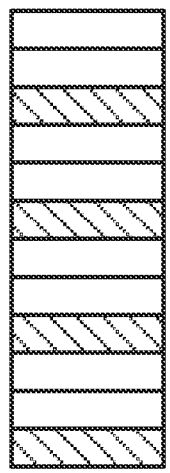
FIG. 2 is a schematic diagram of an example of a location of a subcarrier used to carry a reference signal according to this application.
Figure 11:
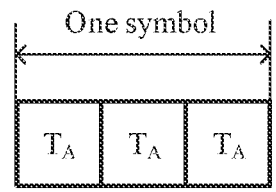
FIG. 11 is a schematic diagram of an example of a structure of a symbol used to carry a reference signal according to this application.

As an example instead of a limitation, for example, as shown in FIG. 2, the density of the first reference signal and the density of the second reference signal in this application may be ⅓, or two subcarriers that carry no reference signal may be spaced between two adjacent subcarriers that carry a reference signal. In this case, as shown in FIG. 11, one symbol that carries the first reference signal includes three $T_A$s. Similarly, one symbol that carries the second reference signal includes three $T_B$s.

Figure 3:
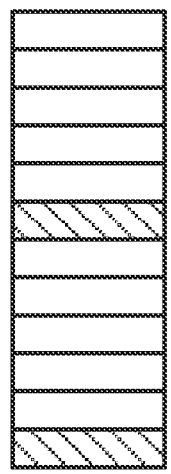
FIG. 3 is a schematic diagram of another example of a location of a subcarrier used to carry a reference signal according to this application.

For another example, as shown in FIG. 3, the density of the first reference signal and the density of the second reference signal in this application may be ⅙, or one RB may include two subcarriers that carry a reference signal, and five subcarriers that carry no reference signal may be spaced between the two subcarriers that carry a reference signal. In this case, one symbol that carries the first reference signal includes six $T_A$s. Similarly, one symbol that carries the second reference signal includes six $T_B$s.

Figure 4:
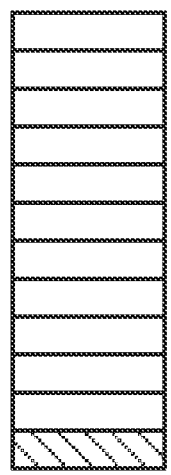
FIG. 4 is a schematic diagram of still another example of a location of a subcarrier used to carry a reference signal according to this application.

For another example, as shown in FIG. 4, the density of the first reference signal and the density of the second reference signal in this application may be 1/12, or one RB may include only one subcarrier carrying a reference signal. In this case, one symbol that carries the first reference signal includes 12 $T_A$s. Similarly, one symbol that carries the second reference signal includes 12 $T_B$s.

Case 2

As shown in Case 1, because the lengths K of the $T_A$ and the $T_B$ need to meet both the foregoing condition 1 and the foregoing condition 2, selection and setting of the first sequence and the second sequence are limited.

Figure 5:
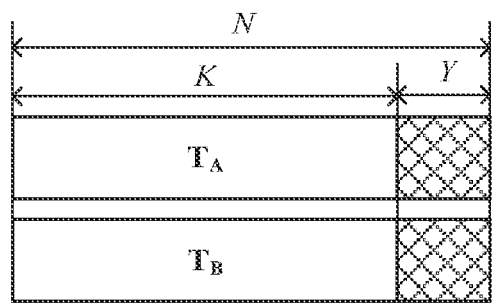
FIG. 5 is a schematic diagram of still another example of a location of a subcarrier used to carry a reference signal according to this application.
Figure 5:

In this regard, as shown in FIG. 5, in this application, a time domain modulated sequence (denoted as a third sequence) that may be used to generate the first reference signal may include the first sequence and a preset padding sequence. In addition, a time domain modulated sequence (denoted as a fourth sequence) that may be used to generate the second reference signal may include the second sequence and the preset padding sequence.

It is assumed that a length of the padding sequence is Y. To implement full-bandwidth channel estimation, the length of the sequence used to generate the reference signal needs to be the same as the quantity (denoted as N) of subcarriers occupied by the reference signal in frequency domain. That is, the following condition (denoted as a condition 3) needs to be met:

$$K+Y=N$$

Therefore, the foregoing condition 1 and the foregoing condition 3 can be easily met only by adjusting a value of Y.

For example, in this application, the padding sequence may be a sequence of modulated symbols obtained after time domain modulation, for example, pi/2-BPSK modulation, is performed on a preset padding data sequence.

For example, the padding sequence may include "0"s of a specified quantity(for example, Y).

Alternatively, the padding sequence may include "1"s of a specified quantity (for example, Y).

It should be noted that, in Case 2, because the padding sequence is used, the lengths K. of $T_A$ and $T_B$ do not need to meet the foregoing condition 2. Therefore, the density of the reference signal in this application does not need to be set to $D=1/(3\times2^7)$.

Figure 6:
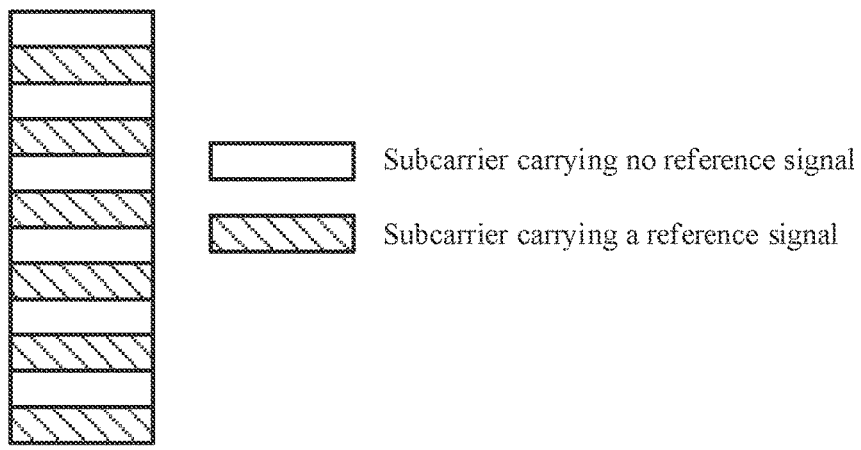
FIG. 6 is a schematic diagram of an example of a structure of a first sequence according to this application.

That is, in this application, the density of the reference signal may be randomly set, for example, may be set to ½. To be specific, as shown in FIG. 6, in Case 2, the density of the first reference signal and the density of the second reference signal in this application may be ½.

The following describes a configuration of a time domain resource used to carry a reference signal in this application.

Figure 7:
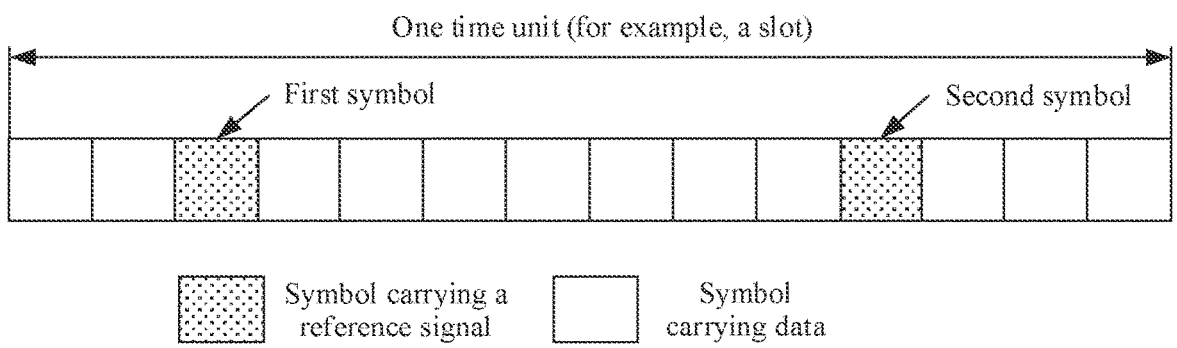
FIG. 7 is a schematic diagram of an example of a location of a symbol used to carry a reference signal according to this application.

For example, as shown in FIG. 7, in one time unit, a specified quantity (for example, α) of symbols may be spaced between a symbol (denoted as a first symbol) that carries the first reference signal and a symbol (denoted as a second symbol) that carries the second reference signal. In addition, a specific value of α may be specified by a communication system or in a communication protocol. Alternatively, the specific value of α may be delivered by the access device to the terminal device.

Figure 8:
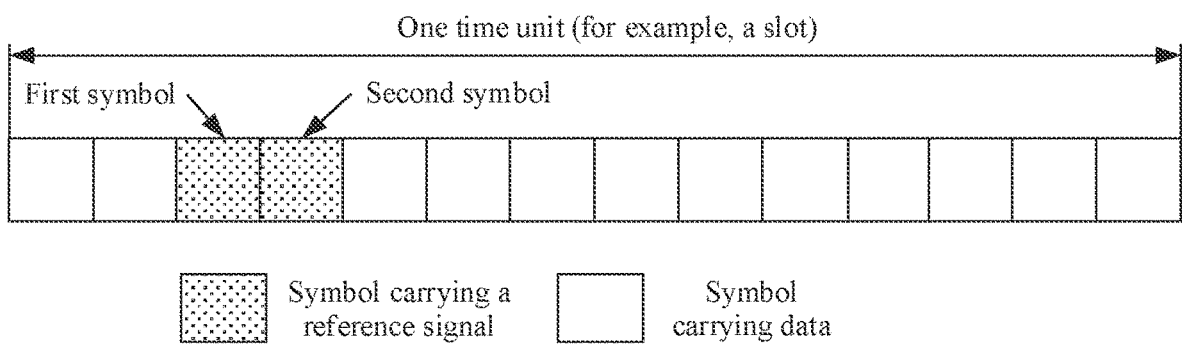
FIG. 8 is a schematic diagram of another example of a location of a symbol used to carry a reference signal according to this application.

For another example, as shown in FIG. 8, in one time unit, the first symbol and the second symbol may be consecutive.

In this application, a location that is in a time unit and that is of one, of the first symbol and the second symbol, that is first transmitted (for example, first sent) may be a $\beta^{th}$ symbol in the time unit, and a specific value of β may be specified by a communication system or in a communication protocol. Alternatively, the specific value of β may be delivered by the access device to the terminal device.

In this application, a location that is in a time unit and that is of one, of the first symbol and the second symbol, that is later transmitted (for example, later sent) may be a $\gamma^{th}$ symbol in the time unit, and a specific value of γ may be specified by a communication system or in a communication protocol. Alternatively, the specific value of γ may be delivered by the access device to the terminal device.

As described above, in this application, to improve frequency domain flatness of the reference signal, two reference signals need to be sent in a same time unit (for example, a same slot), or two symbols (denoted as target symbols) used to carry the reference signals are included in the same time unit. Therefore, compared with an existing reference signal sending manner, in a manner in this application, a quantity of symbols occupied by a reference signal increases.

In this regard, to reduce time domain resource overheads of the reference signal in this application, a length of the target symbol may be reduced.

Figure 9:
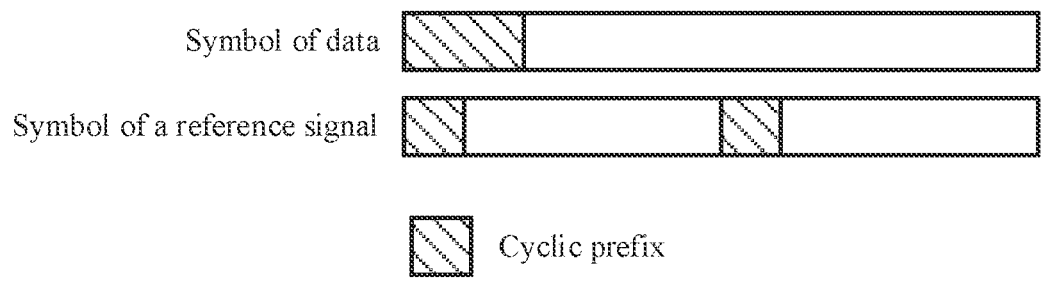
FIG. 9 is a schematic diagram of an example of a length of a symbol used to carry a reference signal according to this application.

As shown in FIG. 9, for example, when the reference signal is a DMRS, assuming that a length of a symbol of data (specifically, an OFDM symbol of the data) before a cyclic prefix (CP) is added is E, a length of the target symbol in this application may be E/2. Therefore, a total length of symbols that are sent in a same time unit and that are used to carry the reference signal in this application can be the same as a length of one symbol used to carry the data, so that the time domain resource overheads of the reference signal in this application can be reduced.

It should be noted that, to ensure that the length of the target symbol is ½ of the length of the symbol of the data, a subcarrier spacing of the target symbol may be twice a subcarrier spacing of the symbol of the data.

For another example, when the reference signal is a signal such as a CSI-RS, an SSS, or an SRS, because the reference signal is not associated with the symbol of the data, in this case, the length of the target symbol (for example, the first symbol and the second symbol) may be ½ of a default symbol length. The default symbol length may be a length of a symbol used to carry the reference signal (for example, the signal such as the CSI-RS, the SSS, or the SRS) in the conventional technology. Alternatively, the default symbol length may be a symbol length specified in a bandwidth part (BWP) configured by a network device. In addition, a specific value of the default symbol length may be specified by a communication system or in a communication protocol, or the specific value of the default symbol length may be configured by the access device for the terminal device by using, for example, higher layer signaling.

In addition, to improve a multipath resistance capability of the reference signal, a CP may be added to the target symbol. When the length of the target symbol is ½ of the length of the symbol of the data, a length of the CP of the reference signal is also ½ of the CP of the symbol of the data. That is, because the length of the CP of the reference signal is less than the length of the CP of the symbol of the data, the multipath resistance capability of the reference signal is lower than that of the symbol of the data. Consequently, demodulation performance is affected.

Figure 10:
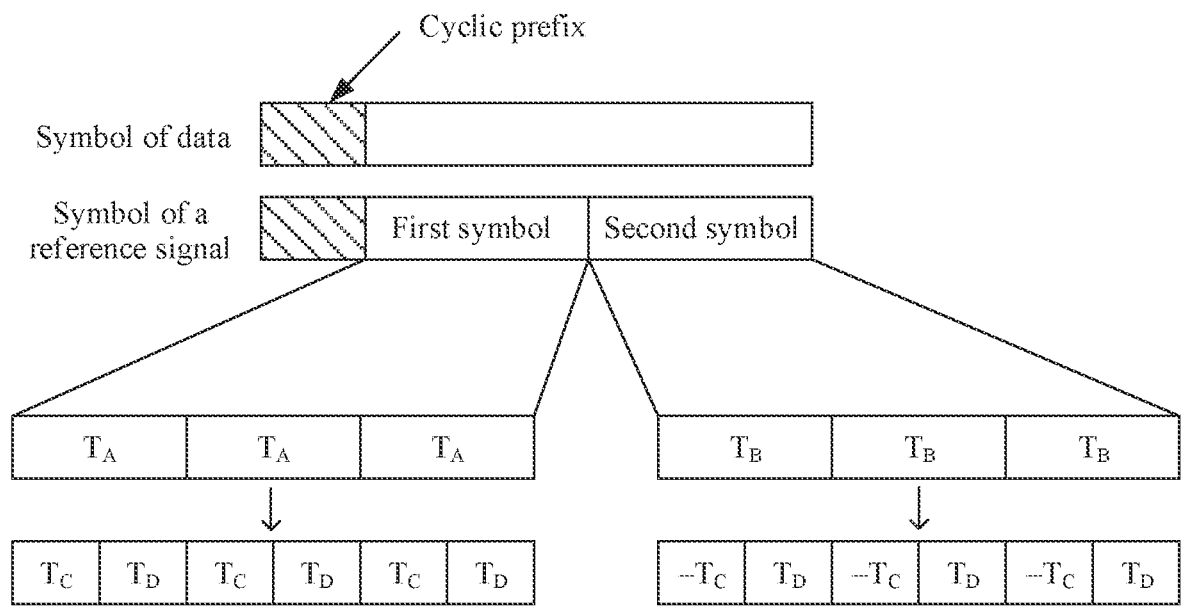
FIG. 10 is a schematic diagram of another example of a length of a symbol used to carry a reference signal according to this application.

In this regard, as shown in FIG. 10, in this application, the first sequence $T_A$ and the second sequence $T_B$ may be generated in the following manner A.

Manner A

According to a characteristic of the complementary sequences, assuming that $T_C$ (namely, an example of a first subsequence Ta) and $T_D$ (namely, an example of a second subsequence) are a complementary sequence pair, $T_A=[T_C, T_D]$ and $T_B=[-T_C, T_D]$ are still a complementary sequence pair.

That is, in this application, tail elements (namely, $T_D$s) of the first sequence and the second sequence are the same. Therefore, a symbol used to carry the first reference signal and a symbol used to carry the second reference signal may be consecutive. Further, a tail of a first-sent reference signal in the first reference signal and the second reference signal may be used as a CP of a later-sent reference signal, that is, an additional CP does not need to be added to the later-sent reference signal. Therefore, even if a length of a CP of the first-sent reference signal is the same as the length of the CP of the symbol of the data, a total length of CPs of the first reference signal and the second reference signal does not increase.

FIG. 11 shows a configuration status of a symbol of a reference signal in this application when a frequency domain density of the reference signal is 1/3. As described above, when the frequency domain density of the reference signal is 1/3, a sequence of the reference signal is repeated three times in each symbol, as shown in FIG. 11. Last 1/6 of the two target symbols (for example, the first symbol and the second symbol) used to carry the reference signal are the same, and are each equivalent to 1/12 of a length of a common symbol. By comparison, a length of a common CP in NR is 1/14 of a length of a symbol. It can be learned that a length of an equivalent CP in this solution is greater than the length of the common CP, so that multipath resistance performance of the reference signal does not deteriorate.

Figure 12:
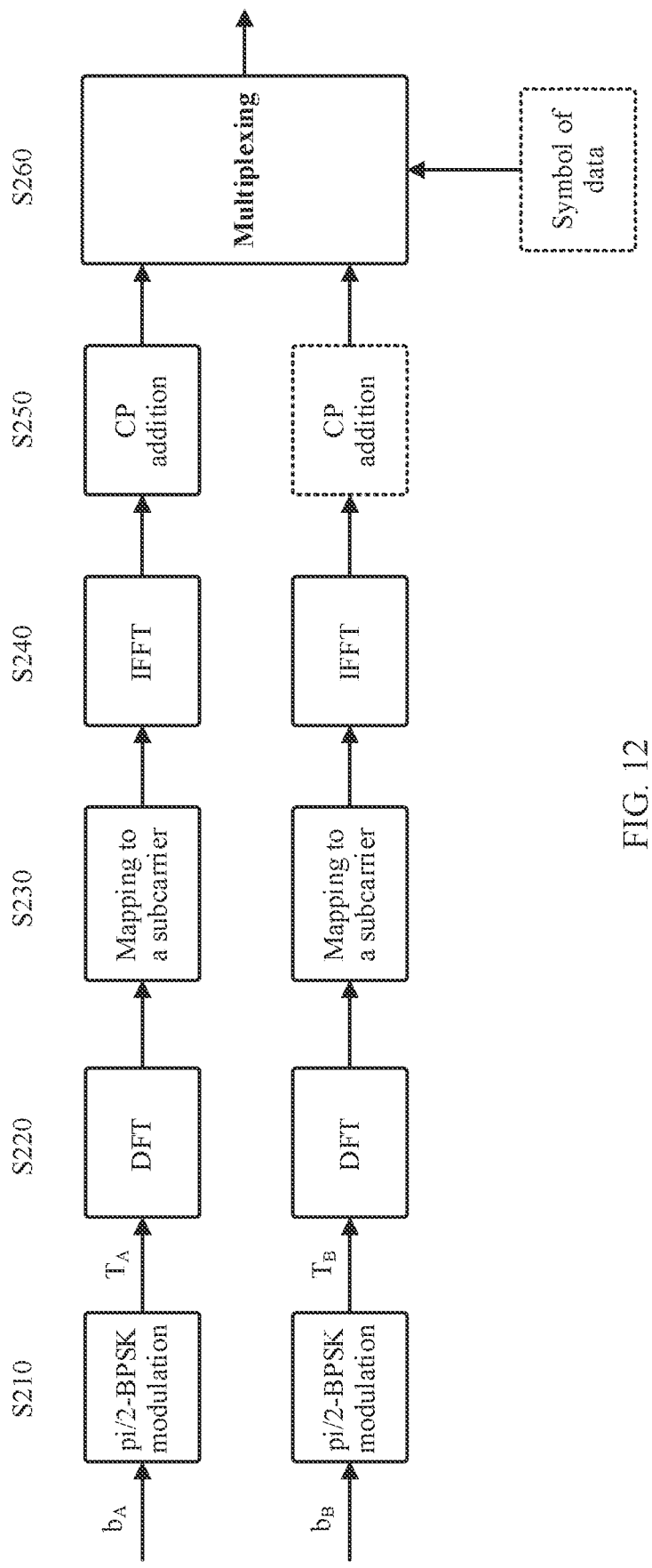
FIG. 12 is a schematic diagram of an example of a transmission process of a reference signal according to this application.

FIG. 12 shows a reference signal transmission process according to this application.

As shown in FIG. 12, in S210, a transmit end device may perform time domain modulation (for example, pi/2-BPSK) on a first original sequence $b_A$ to generate a first sequence $T_A$, and may perform time domain modulation (for example, pi/2-BPSK) on a second original sequence $b_B$ to generate a second sequence $T_B$.

In S220, the transmit end device may perform frequency domain transform (for example, DFT) on the first sequence $T_A$ to generate a first frequency domain sequence, and may perform frequency domain transform (for example, DFT) on the second sequence $T_B$ to generate a second frequency domain sequence.

The foregoing process is similar to the process described in the foregoing manner of generating the first sequence and the second sequence. To avoid repetition, detailed description thereof is omitted herein.

In S230, the transmit end device may map the generated first frequency domain sequence and second frequency domain sequence to subcarriers separately.

As an example instead of a limitation, the transmit end device may perform the foregoing mapping according to the following formula:

$$\alpha_{m,l}^p = r(k)$$

For a first reference signal, $\alpha_{m,l}^p$ represents a component that is of the first frequency domain sequence and that is mapped to a first antenna port, a first subcarrier, and a first symbol; r(k) represents a $k^{th}$ element in the frequency domain sequence transformed from the first sequence, and k∈[0, K−1]; K represents a length of the first sequence; p represents a port number of the first antenna port; m represents an index of the first subcarrier; l represents an index of the first symbol; m=K/D+C, and C∈[0, 2]; and D represents a frequency domain density of the first reference signal.

For a second reference signal, $\alpha_{m,l}^p$ represents a component that is of the second frequency domain sequence and that is mapped to the first antenna port, the first subcarrier, and a second symbol; r(k) represents a $k^{th}$ element in the frequency domain sequence transformed from the second sequence, and k∈[0, K−1]; K represents a length of the second sequence; p represents a port number of the first antenna port; m represents an index of the first subcarrier; l represents an index of the second symbol; m=K/D+C, and C∈[0, 2]; and D represents a frequency domain density of the second reference signal.

It should be understood that the foregoing enumerated mapping manner is merely an example for description, and this application is not limited thereto. For example, mapping may be alternatively performed according to the following formula:

$$\alpha_{m,l}^p = w(z) \times r(2q+z), \text{ where}$$

w(z) represents a frequency domain orthogonal sequence of r(2q+z); r(2q+z) represents a $(2q+z)^{th}$ element in the frequency domain sequence transformed from the first sequence or the second sequence, and 2q+z∈[0, K−1]; m=(2q+z)/D+C, C∈[0, 2], q∈[0, K/2−1], and z∈[0, 1].

In S240, the transmit end device may perform inverse fast Fourier transform (IFFT) on the first frequency domain sequence mapped to a carrier, to generate a symbol (for example, the first symbol) of the first reference signal, and the transmit end device may perform IFFT on the second frequency domain sequence mapped to a carrier, to generate a symbol (for example, the second symbol) of the second reference signal.

In S250, the transmit end device may add a CP to the first symbol.

For example, when the first symbol and the second symbol are consecutive, if the first sequence and the second sequence are generated in the foregoing manner A, a length of the CP added to the first symbol may be the same as a length of a CP added to a symbol of data, and a CP may not be added to the second symbol.

For another example, when the first symbol and the second symbol are nonconsecutive, the transmit end device may further add a CP to the second symbol, and lengths of CPs respectively added to the first symbol and the second symbol may each be 1/2 of a length of a CP added to a symbol of data.

In S260, the transmit end device may multiplex the first symbol and the second symbol that are generated as described above.

It should be noted that the first symbol, the second symbol, and the symbol of the data may be further multiplexed when the first reference signal and the second reference signal are DMRSs.

Figure 13:
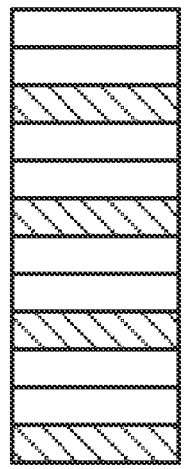
FIG. 13 is a schematic diagram of an example of a frequency domain position of reference signals on different ports according to this application.
Figure 13:
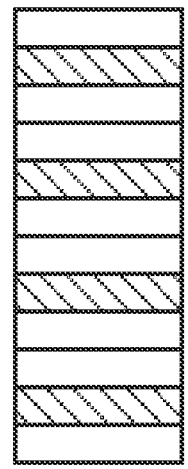
Figure 13:
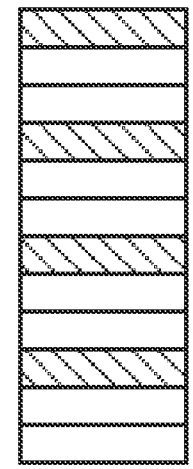
Figure 13:
Figure 13:
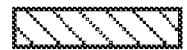

In addition, as described above, in this application, the reference signal in this application may have a specified density in frequency domain, for example, 1/3 or 1/6. Therefore, as shown in FIG. 13, reference signals of different ports may have different locations (specifically, locations of subcarriers carrying the reference signals of different ports) in frequency domain, so that the reference signals of a plurality of ports can be sent by using a same symbol.

Figure 14:
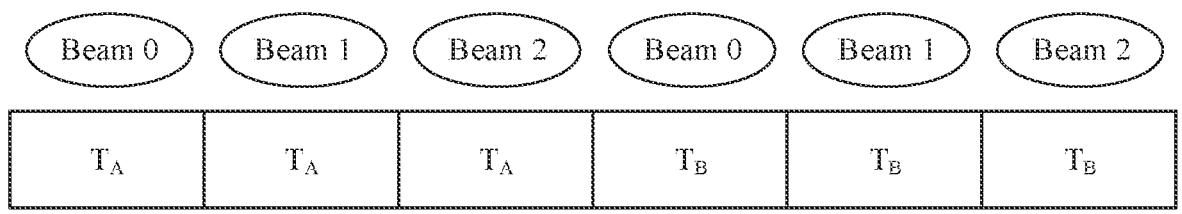
FIG. 14 is a schematic diagram of an example of a correspondence between a symbol of a reference signal and a beam of a reference signal according to this application.
Figure 15:
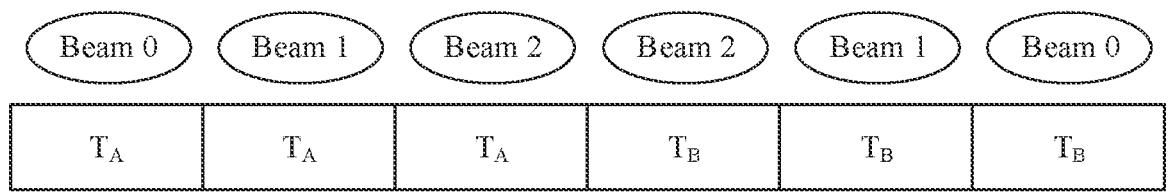
FIG. 15 is a schematic diagram of another example of a correspondence between a symbol of a reference signal and a beam of a reference signal according to this application.

In addition, as described above, in this application, the reference signal in this application may have a specified density in frequency domain, for example, 1/3 or 1/6. Therefore, as shown in FIG. 14 or FIG. 15, in the first symbol, the first sequence (or the first frequency domain sequence) is repeated for a plurality of times.

Therefore, in this application, especially when the reference signal includes a CSI-RS, an SRS, or an SSS, beam scanning can be conveniently performed in such a time domain structure.

For example, when the density is 1/3, there are three first sequences in the first symbol. In this case, the transmit end device may respectively send the three first sequences by using three different beams. Similarly, the transmit end device may respectively send three second sequences in the second symbol by using three different beams.

For dual-symbol beam scanning in this application, a receive end device may need to scan a same beam set on the first symbol and the second symbol. As shown in FIG. 14, a beam 0, if a beam 1, and a beam 2 are scanned on the first symbol, the beam 0, the beam 1, and the beam 2 also need to be scanned on the second symbol, and the two symbols are then merged.

It should be noted that, in this application, as shown in FIG. 14, sequences of beam scanning performed by the receive end device on the two symbols may be the same, or as shown in FIG. 15, sequences of beam scanning performed by the receive end device on the two symbols may be different.

Therefore, according to the solution in this application, the receive end device does not need to perform beam switching between the first symbol and the second symbol.

Similarly, a structure of the reference signal in this application may be used for beam scanning performed by the transmit end device.

Figure 16:
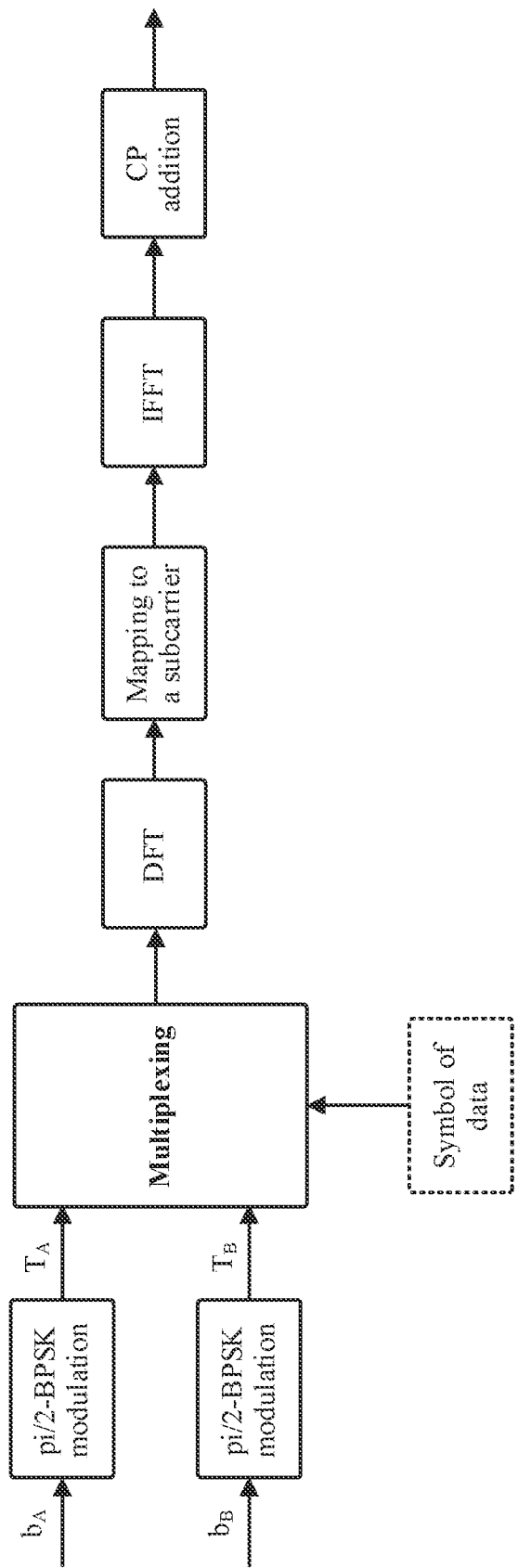
FIG. 16 is a schematic diagram of another example of a transmission process of a reference signal according to this application.
Figure 17:
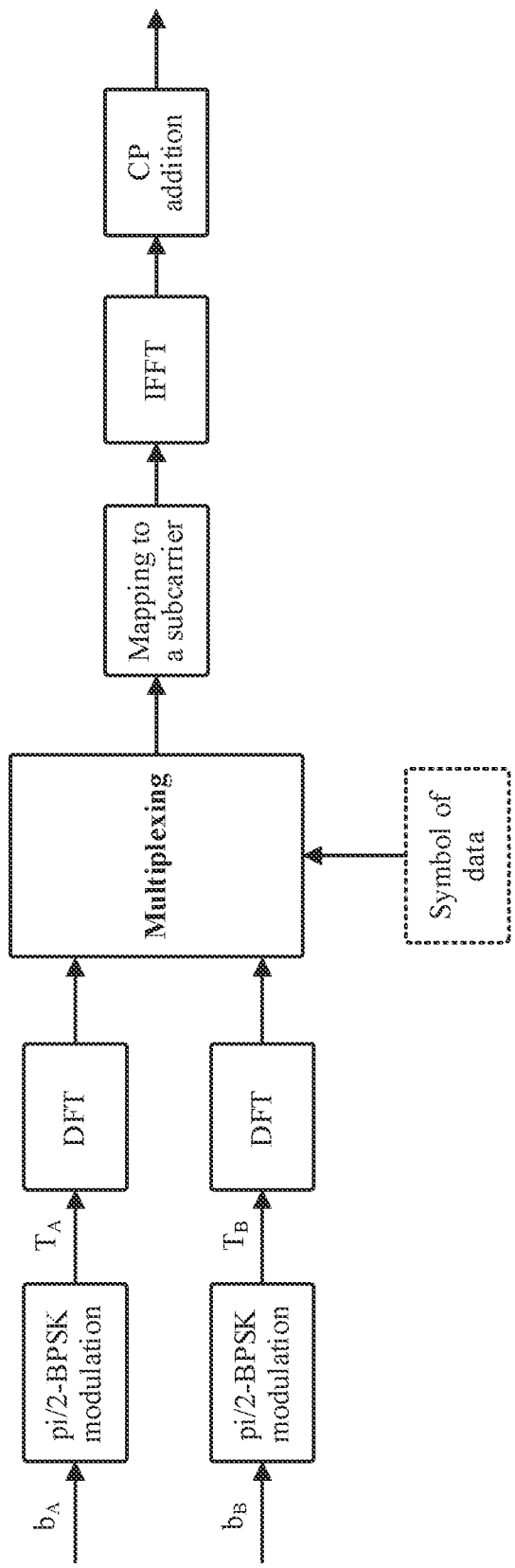
FIG. 17 is a schematic diagram of still another example of a transmission process of a reference signal according to this application.

It should be understood that the reference signal transmission process shown in FIG. 12 is merely an example for description, and this application is not limited thereto. For example, as shown in FIG. 16, reference signal multiplexing may alternatively be performed after time domain modulation (for example, pi/2-BPSK modulation) and before DFT. Alternatively, as shown in FIG. 17, reference signal multiplexing may be performed after DFT and before subcarrier mapping. This is not particularly limited in this application.

The following describes actions of the receive end device in this application.

In this application, the receive end device may determine a location, for example, a time domain position and a frequency domain position, of a time-frequency resource used to carry the first reference signal and the second reference signal.

For example, the location of the time-frequency resource used to carry the first reference signal and the second reference signal may be specified by a communication system or a communication protocol.

Alternatively, the access device may notify the receive end device of the location of the time-frequency resource used to carry the first reference signal and the second reference signal by using, for example, higher layer signaling.

The first reference signal and the second reference signal may be carried on a same subcarrier.

In addition, the first reference signal and the second reference signal may be located in different symbols in a same time unit.

Therefore, the receive end device can detect the first reference signal and the second reference signal on the time-frequency resource by using a same antenna port, and perform channel estimation based on the first reference signal and the second reference signal.

For example, when performing channel estimation, the receive end device may jointly process the two received sequences.

For example, the receive end device may transform a first original sequence $s_A(k)$ to frequency domain to obtain a frequency domain sequence $r_A(k)$, and the receive end device may transform a second original sequence $s_B(k)$ to frequency domain to obtain a frequency domain sequence $r_B(k)$.

According to a property of complementary sequences, it can be deduced that:

$$|r_A(k)|^2 + |r_B(k)|^2 = 2.$$

Assuming that channels of the two symbols used to carry the reference signals remain unchanged, the receive end device may deduce that a frequency domain sequence of the received first reference signal is:

$$y\_A(k) = H(k)r_A(k) + n_A(k)$$

In addition, the receive end device may deduce that a frequency domain sequence of the received second reference signal is:

$$y\_B(k) = H(k)r_B(k) + n_B(k)$$

$H(k)$ is a to-be-estimated channel gain, $n_A(k)$ is noise and interference of the first reference signal, and $n_B(k)$ is noise and interference of the second reference signal. It is assumed that a noise power of the first reference signal and a noise power of the second reference signal are both N_0.

Channel estimation in frequency domain may be recorded as follows:

$$\tilde{H}(k) = (y\_A(k)r_A^*(k) + y\_B(k)r_B^*(k))/2 =$$
$$H(k)(|r_A(k)|^2 + |r_B(k)|^2 + n(k)/2 = H(k) + n(K)/2$$

$n(k) = n_A(k)r_A^*(k) + n_B(k)r_B^*(k)$. A power of $n(k)/2$ can be obtained as N_0/2. In other words, a noise power obtained after the first reference signal and the second reference signal are combined is halved.

It should be noted that after obtaining $\tilde{H}(k)$, the receive end device may further perform smoothing and interpolation on channel estimation values of different subcarriers, to improve channel estimation performance.

It should be understood that the foregoing channel estimation method of the receive end device is merely an example for description, and this application is not limited hereto. For example, the receive end device may perform channel estimation based only on one of the first reference signal and the second reference signal. A method for and a process of performing channel estimation based on one reference signal may be similar to those in a conventional technology. To avoid repetition, detailed description thereof is omitted herein.

According to the solution provided in this application, two reference signals are generated based on the first sequence and the second sequence that are complementary sequences to each other, and the two reference signals are sent by using the same antenna port and the same resource, so that flatness of the reference signals in frequency domain can be improved, and performance of the reference signals can be further improved.

Figure 18:
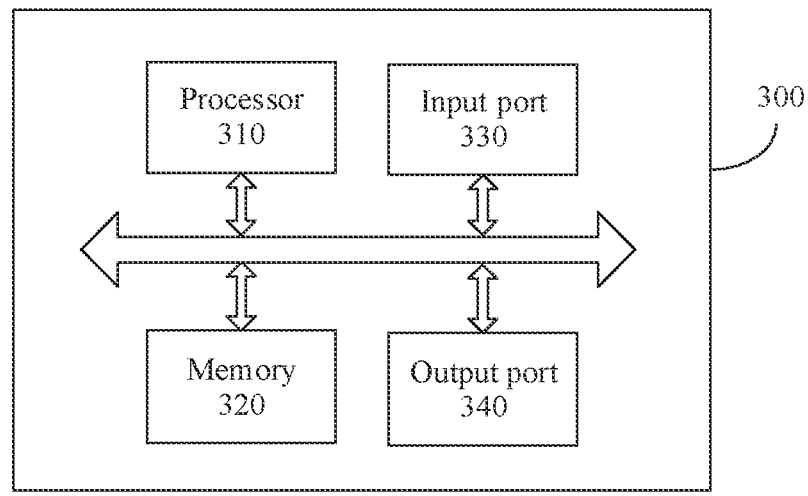
FIG. 18 is a schematic block diagram of an example of a reference signal sending apparatus according to this application.

According to the foregoing methods, FIG. 18 is a schematic diagram of a wireless communication apparatus 300 according to an embodiment of this application.

The apparatus 300 may be a transmit end device, namely, a sending device (for example, an access device or a terminal device) of a reference signal, or may be a chip or a circuit, for example, a chip or a circuit that may be disposed in the transmit end device.

The apparatus 300 may include a processing unit 310 (that is, an example of a processing unit), and optionally, may further include a storage unit 320. The storage unit 320 is configured to store instructions.

In a possible manner, the processing unit 310 is configured to execute the instructions stored in the storage unit 320, so that the apparatus 300 implements the steps performed by the transmit end device in the foregoing methods.

Further, the apparatus 300 may further include an input port 330 (that is, an example of a communication unit) and an output port 340 (that is, another example of the communication unit). Further, the processing unit 310, the storage unit 320, the input port 330, and the output port 340 may communicate with each other through an internal connection path, to transmit a control signal and/or a data signal. The storage unit 320 is configured to store a computer program. The processing unit 310 may be configured to invoke the computer program from the storage unit 320 and run the computer program, to complete the steps performed by the terminal device in the foregoing methods. The storage unit 320 may be integrated into the processing unit 310, or may be disposed separately from the processing unit 310.

Optionally, in a possible manner, the input port 330 may be a receiver, and the output port 340 is a transmitter. The receiver and the transmitter may be a same physical entity or different physical entities. When being the same physical entity, the receiver and the transmitter may be collectively referred to as a transceiver.

Optionally, in a possible manner, the input port 330 is an input interface, and the output port 340 is an output interface.

In an implementation, it may be considered that functions of the input port 330 and the output port 340 are implemented by using a transceiver circuit or a dedicated transceiver chip. It may be considered that the processing unit 310 is implemented by using a dedicated processing chip, a processing circuit, a processing unit, or a general-purpose chip.

In another implementation, it may be considered that a communication device (for example, a first device) provided in this embodiment of this application is implemented by using a general-purpose computer. To be specific, program code for implementing functions of the processing unit 310, the input port 330, and the output port 340 is stored in the storage unit 320, and a general-purpose processing unit executes the code in the storage unit 320 to implement the functions of the processing unit 310, the input port 330, and the output port 340.

In an implementation, the processing unit 310 is configured to generate a first reference signal based on a first sequence, and generate a second reference signal based on a second sequence, where the first sequence and the second sequence are complementary sequences.

The output port 340 is configured to send the first reference signal and the second reference signal by using a same antenna port and a same resource.

Optionally, the output port 340 is configured to send the first reference signal and the second reference signal by using the same antenna port, the same resource, and a same beam set.

Optionally, the output port 340 is configured to send the first reference signal and the second reference signal based on a same beam transmit sequence by using the same antenna port, the same resource, and the same beam set.

Optionally, the processing unit 310 is configured to generate the first reference signal based on the first sequence and a padding sequence, and the first device generates the second reference signal based on the second sequence and the padding sequence, where a quantity of subcarriers occupied by the first reference signal or the second reference signal is N, lengths of the first sequence and the second sequence are K, a length of the padding sequence is Y, and N=Y+K.

Functions and actions of the modules or units in the apparatus 300 enumerated above are merely examples for description. When the apparatus 300 is configured in or is the transmit end device, the modules or units in the apparatus 300 may be configured to perform the actions or processing processes performed by the transmit end device in the foregoing methods. Herein, to avoid repetition, detailed description thereof is omitted.

For concepts, explanations, detailed descriptions, and other steps of the apparatus 300 that are related to the technical solutions provided in the embodiments of this application, refer to the descriptions of the content in the foregoing methods or other embodiments. Details are not described herein again.

Figure 19:
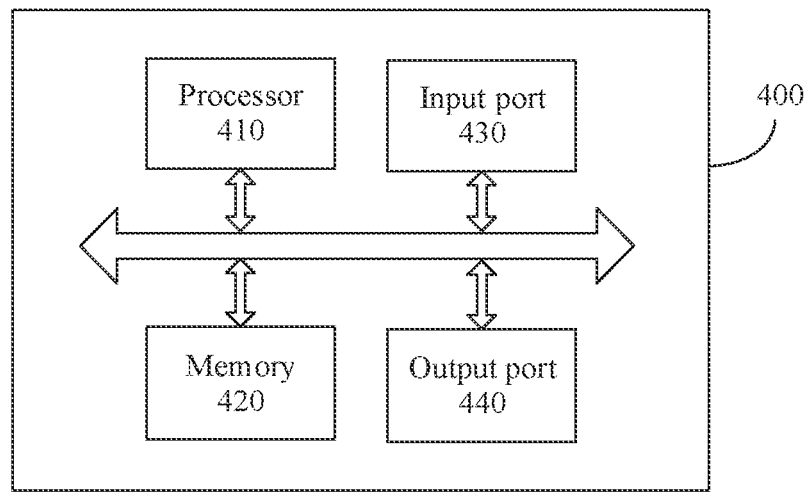
FIG. 19 is a schematic block diagram of another example of a reference signal sending apparatus according to this application.

According to the foregoing methods, FIG. 19 is a schematic diagram of a wireless communication apparatus 400 according to an embodiment of this application.

The apparatus 400 may be a receive end device, namely, a receiving device (for example, a terminal device or an access device) of a first reference signal and a second reference signal, or may be a chip or a circuit, for example, a chip or a circuit that may be disposed in the receive end device.

The apparatus 400 may include a processing unit 410 (that is, an example of the processing unit) and a storage unit 420. The storage unit 420 is configured to store instructions.

The processing unit 410 is configured to execute the instructions stored in the storage unit 420, so that the apparatus 400 implements the steps performed by the access device in the foregoing methods.

Further, the apparatus 400 may further include an input port 430 (that is, an example of a communication unit) and an output port 440 (that is, another example of the communication unit). Further, the processing unit 410, the storage unit 420, the input port 430, and the output port 440 may communicate with each other through an internal connection path, to transmit a control signal and/or a data signal. The storage unit 420 is configured to store a computer program. The processing unit 410 may be configured to invoke the computer program from the storage unit 420 and run the computer program, to control the input port 430 to receive a signal and control the output port 440 to send a signal, to complete the steps performed by the terminal device in the foregoing methods. The storage unit 420 may be integrated into the processing unit 410, or may be disposed separately from the processing unit 410.

Optionally, if the apparatus 400 is a communication device (for example, the access device), the input port 430 is a receiver, and the output port 440 is a transmitter. The receiver and the transmitter may be a same physical entity or different physical entities. When being the same physical entity, the receiver and the transmitter may be collectively referred to as a transceiver.

Optionally, if the apparatus 400 is a chip or a circuit, the input port 430 is an input interface, and the output port 440 is an output interface.

In an implementation, it may be considered that functions of the input port 430 and the output port 440 are implemented by using a transceiver circuit or a dedicated transceiver chip. It may be considered that the processing unit 410 is implemented by using a dedicated processing chip, a processing circuit, a processing unit, or a general-purpose chip.

In another implementation, it may be considered that a communication device (for example, an access device) provided in this embodiment of this application is implemented by using a general-purpose computer. To be specific, program code for implementing functions of the processing unit 410, the input port 430, and the output port 440 is stored in the storage unit 420, and a general-purpose processing unit executes the code in the storage unit 420 to implement the functions of the processing unit 410, the input port 430, and the output port 440.

In an implementation, the input port 430 is configured to receive the first reference signal and the second reference signal by using a same antenna port and a same resource, where the first reference signal is generated based on a first sequence, the second reference signal is generated based on a second sequence, and the first sequence and the second sequence are complementary sequences.

The processing unit 410 is configured to perform channel estimation based on the first reference signal and/or the second reference signal.

Functions and actions of the modules or units in the apparatus 400 enumerated above are merely examples for description. When the apparatus 400 is configured in or is the receive end device, the modules or units in the apparatus 400 may be configured to perform the actions or processing processes performed by the receive end device in the foregoing methods. Herein, to avoid repetition, detailed description thereof is omitted.

Figure 20:
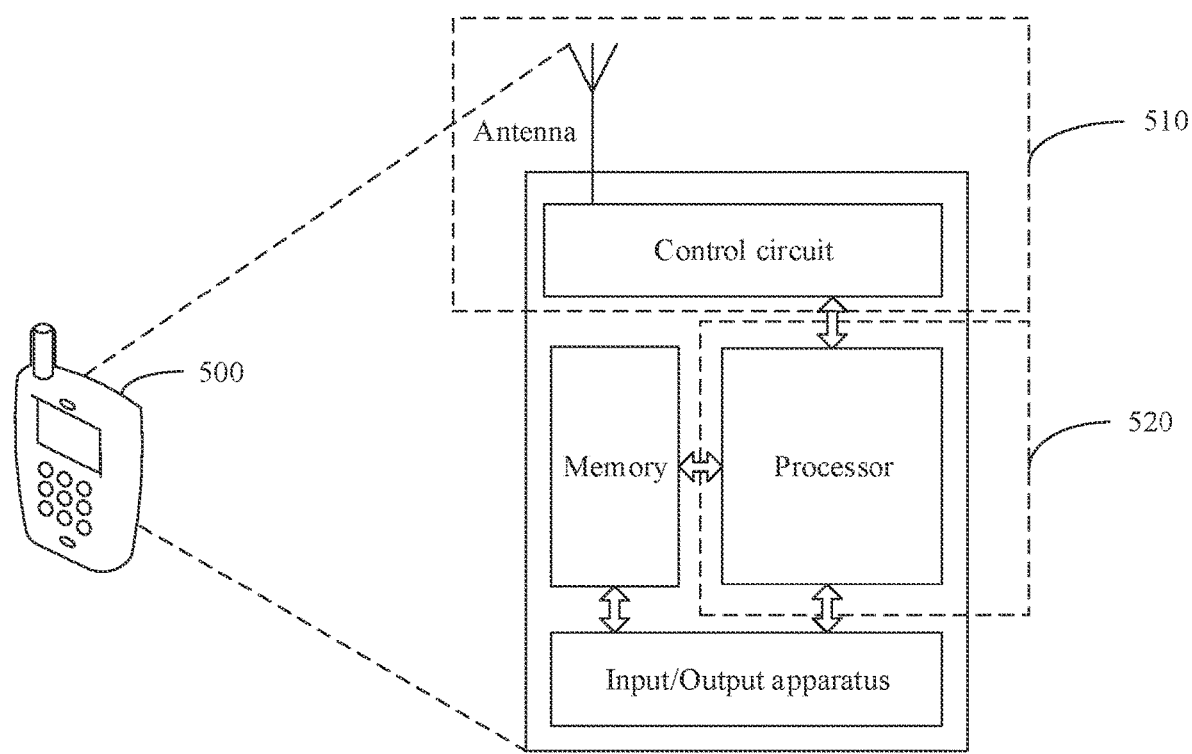
FIG. 20 is a schematic diagram of a structure of an example of a terminal device according to this application.

For concepts, explanations, detailed descriptions, and other steps of the apparatus 400 that are related to the technical solutions provided in the embodiments of this application, refer to the descriptions of the content in the foregoing methods or other embodiments. Details are not described herein again, FIG. 20 is a schematic diagram of a structure of a terminal device 500 according to this application. The apparatus 400 may be configured in the terminal device 500, or the apparatus 400 may be the terminal device 500. Alternatively, the terminal device 500 may perform an action performed by the terminal device (for example, the receive end device or the transmit end device) in the foregoing methods.

For ease of description, FIG. 20 shows only main components of the terminal device. As shown in FIG. 20, the terminal device 500 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the action described in the foregoing embodiments of the reference signal sending method. The memory is mainly configured to store the software program and the data. The control circuit is mainly configured to: perform conversion between a baseband signal and a radio frequency signal, and process the radio frequency signal. A combination of the control circuit and the antenna may also be collectively referred to as a transceiver that is mainly configured to receive and transmit a radio frequency signal in an electromagnetic wave form. The input/output apparatus, such as a touchscreen, a display, or a keyboard, is mainly configured to receive data entered by a user and output data to the user.

After the terminal device is powered on, the processor may read the software program in a storage unit, explain and execute instructions of the software program, and process the data of the software program. When data needs to be sent in a wireless manner, the processor performs baseband processing on to-be-sent data, and outputs a baseband signal to a radio frequency circuit. After performing radio frequency processing on the baseband signal, the radio frequency circuit sends a radio frequency signal to the outside by using the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 20 shows only one memory and only one processor. An actual terminal device may have a plurality of processors and a plurality of memories. The memory may also be referred to as a storage medium, a storage device, or the like. This is not limited in the embodiments of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 20 integrates functions of the baseband processor and the central processing unit. A person skilled in the art may understand that the baseband processor and the central processing unit may be separate processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of software program. The processor executes the software program to implement a baseband processing function.

For example, in this embodiment of this application, the antenna and the control circuit that have receiving and sending functions may be used as a transceiver unit 510 of the terminal device 500, and the processor that has a processing function may be considered as a processing unit 520 of the terminal device 500. As shown in FIG. 20, the terminal device 500 includes the transceiver unit 510 and the processing unit 520. The transceiver unit 510 may also be referred to as a transceiver, a transceiver machine, a transceiver apparatus, or the like. Optionally, a component that is in the transceiver unit 510 and that is configured to implement a receiving function may be considered as a receiving unit, and a component that is in the transceiver unit 510 and that is configured to implement a sending function may be considered as a sending unit. That is, the transceiver unit 510 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

Figure 21:
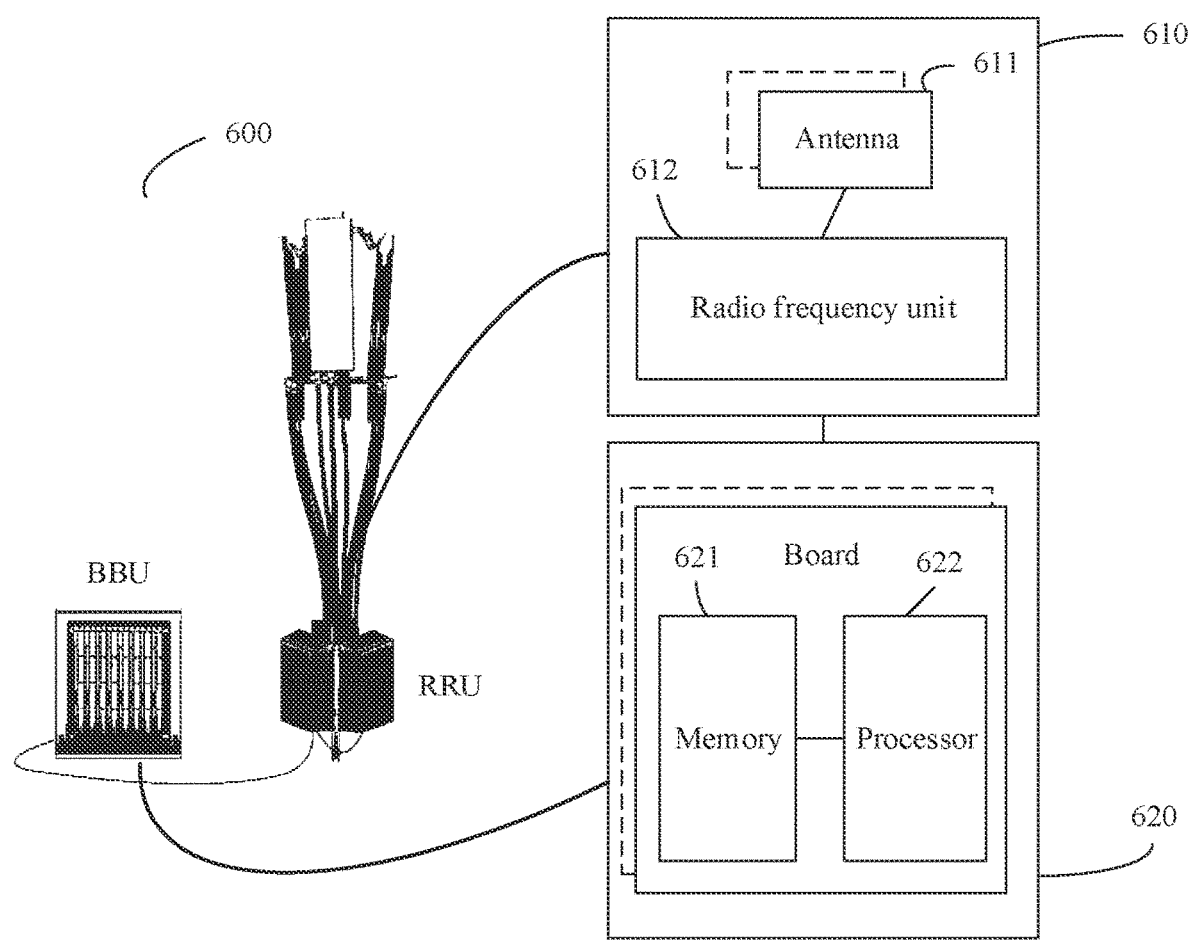
FIG. 21 is a schematic diagram of a structure of an example of an access device according to this application.

FIG. 21 is a schematic diagram of a structure of an access device 600 according to an embodiment of this application, and may be configured to implement a function of an access device (for example, a transmit end device or a receive end device) in the foregoing methods. In addition, the apparatus 400 may be configured in the access device 600, or the apparatus 400 may be the access device 600. The access device 600 includes one or more radio frequency units such as a remote radio unit (RRU) 610 and one or more baseband units (BBUs) (which may also be referred to as a digital unit (DU)) 620. The RRU 610 may be referred to as a transceiver unit, a transceiver machine, a transceiver circuit, a transceiver, or the like, and may include at least one antenna 611 and a radio frequency unit 612. The RRU 610 part is mainly configured to: send and receive a radio frequency signal and perform conversion between a radio frequency signal and a baseband signal, for example, is configured to send the signaling message described in the foregoing embodiments to a terminal device. The BBU 620 part is mainly configured to perform baseband processing, control a base station, and the like. The RRU 610 and the BBU 620 may be physically disposed together, or may be physically separated, that is, a distributed base station.

The BBU 620 is a control center of the base station, or may be referred to as a processing unit, and is mainly configured to complete baseband processing functions such as channel coding, multiplexing, modulation, and spreading. For example, the BBU (the processing unit) 620 may be configured to control the base station 400 to perform an operation procedure related to the network device in the foregoing method embodiments.

In an example, the BBU 620 may include one or more boards, and a plurality of boards may jointly support a radio access network (such as an DT, system or a 5G system) of a single access standard, or may separately support radio access networks of different access standards. The BBU 620 further includes a memory 621 and a processor 622. The memory 621 is configured to store instructions and data that are necessary. For example, the memory 621 stores the codebook and the like in the foregoing embodiments. The processor 622 is configured to control the base station to perform a necessary action, for example, configured to control the base station to perform the operation procedure of the network device in the foregoing method embodiments. The memory 621 and the processor 622 may serve one or more boards. In other words, a memory and a processor may be independently disposed on each board. Alternatively, a plurality of boards may share a same memory and a same processor. In addition, a necessary circuit may be further disposed on each board.

In a possible implementation, with development of a system-on-a-chip (SoC) technology, all or some functions of the part 620 and the part 610 may be implemented by using the SoC technology, for example, implemented through a base station function chip. The base station function chip integrates components such as a processor, a memory, and an antenna port. A program of a base station-related function is stored in the memory. The processor executes the program to implement the base station-related function. Optionally, the base station function chip can also read a memory outside the chip to implement the base station-related function.

It should be understood that a structure of the access device shown in FIG. 21 is merely a possible form, and should not constitute any limitation on the embodiments of this application. This application does not exclude a possibility that there may be a base station structure in another form in the future.

According to the methods provided in the embodiments of this application, an embodiment of this application further provides a communication system, including the foregoing transmit end device and one or more receive end devices.

It should be understood that, the processor in the embodiments of this application may be a central processing unit (CPU), or may alternatively be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatuses, and methods may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments. In addition, functional units in the embodiments of this application may be integrated into one processing unit, or each of the units may exist alone physically, or two or more units may be integrated into one unit. When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A reference signal sending method, comprising:
generating, by a first device, a first reference signal based on a first sequence;
generating, by the first device, a second reference signal based on a second sequence, wherein the first sequence and the second sequence are complementary sequences; and
sending, by the first device, the first reference signal and the second reference signal by using a same antenna port and a same resource,
wherein the first sequence comprises a first subsequence and a second subsequence, the second sequence comprises a third subsequence and the second subsequence, the second subsequence is located at tails of the first sequence and the second sequence, and wherein the first subsequence and the second subsequence are complementary sequences, the third subsequence and the second subsequence are complementary sequences, and the third subsequence is −1 times the first subsequence.

2. The reference signal sending method according to claim 1, wherein the same resource comprises at least one of a same subcarrier set or a same time unit.

3. The reference signal sending method according to claim 1, wherein:
the same resource comprises at least two symbols; and
a symbol carrying the first reference signal and a symbol carrying the second reference signal are consecutive; or
a preset quantity of symbols are spaced between a symbol carrying the first reference signal and a symbol carrying the second reference signal.

4. The reference signal sending method according to claim 1, wherein:
the first reference signal and the second reference signal are reference signals used to demodulate data; and
at least one of a length of a symbol carrying the first reference signal or a length of a symbol carrying the second reference signal is ½ of a length of a symbol carrying the data.

5. The reference signal sending method according to claim 1, wherein when a first symbol carrying the first reference signal and a second symbol carrying the second reference signal are consecutive, one of the first symbol or the second symbol that is sent relatively later among the first symbol and the second symbol does not comprise a cyclic prefix (CP).

6. The reference signal sending method according to claim 1, wherein the sending, by the first device, the first reference signal and the second reference signal by using a same antenna port and a same resource comprises:
sending, by the first device, the first reference signal and the second reference signal by using the same antenna port, the same resource, and a same beam set.

7. The reference signal sending method according to claim 6, wherein the sending, by the first device, the first reference signal and the second reference signal by using the same antenna port, the same resource, and a same beam set comprises:
sending, by the first device, the first reference signal and the second reference signal based on a same beam transmit sequence by using the same antenna port, the same resource, and the same beam set.

8. The reference signal sending method according to claim 1, wherein a length K of the first sequence satisfies $K=2^a 10^b 26^c$ to meet a requirement and a property of complementary sequences, and a, b, and c are non-negative integers.

9. The reference signal sending method according to claim 1, wherein:
   a quantity M of subcarriers spaced between any two adjacent target subcarriers satisfies $M=3\times 2^T-1$, and T is a positive integer or zero; and
   a target subcarrier comprises subcarriers that are in one resource block and that are used to carry the first reference signal and the second reference signal.

10. The reference signal sending method according to claim 1, wherein a component $\alpha_{m,l}^p$ is of a frequency domain sequence of the first reference signal and is mapped to a first antenna port, a first subcarrier, and a first symbol, wherein the component $\alpha_{m,l}^p$ satisfies $\alpha_{m,l}^p=r(k)$, and wherein:
   r(k) represents a $k^{th}$ element in the frequency domain sequence, $k\in[0, K-1]$, K represents a length of the first sequence, p represents a port number of the first antenna port, m represents an index of the first subcarrier, l represents an index of the first symbol, m=k/D+C, $C\in[0, 2]$, and D represents a frequency domain density of the first reference signal.

11. The reference signal sending method according to claim 1, wherein the generating, by a first device, a first reference signal based on a first sequence, and generating, by the first device, a second reference signal based on a second sequence, wherein the first sequence and the second sequence are complementary sequences comprises:
   generating, by the first device, the first reference signal based on the first sequence and a padding sequence; and
   generating, by the first device, the second reference signal based on the second sequence and the padding sequence.

12. A reference signal receiving method, comprising:
   receiving, by a second device, a first reference signal and a second reference signal by using a same antenna port and a same resource, wherein:
      the first reference signal is generated based on a first sequence;
      the second reference signal is generated based on a second sequence; and
      the first sequence and the second sequence are complementary sequences,
      wherein the first sequence comprises a first subsequence and a second subsequence, the second sequence comprises a third subsequence and the second subsequence, the second subsequence is located at tails of the first sequence and the second sequence, and wherein the first subsequence and the second subsequence are complementary sequences, the third subsequence and the second subsequence are complementary sequences, and the third subsequence is −1 times the first subsequence.

13. The reference signal receiving method according to claim 12, wherein the same resource comprises at least one of a same subcarrier set or a same time unit.

14. The reference signal receiving method according to claim 12, wherein:
   the same resource comprises at least two symbols; and
   a symbol carrying the first reference signal and a symbol carrying the second reference signal are consecutive; or
   a preset quantity of symbols are spaced between a symbol carrying the first reference signal and a symbol carrying the second reference signal.

15. The reference signal receiving method according to claim 12, wherein:
   the first reference signal and the second reference signal are reference signals used to demodulate data; and
   at least one of a length of a symbol carrying the first reference signal or a length of a symbol carrying the second reference signal is ½ of a length of a symbol carrying the data.

16. The reference signal receiving method according to claim 12, wherein when a first symbol carrying the first reference signal and a second symbol carrying the second reference signal are consecutive, one of the first symbol or the second symbol that is sent relatively later among the first symbol and the second symbol does not comprise a cyclic prefix (CP).

17. The reference signal receiving method according to claim 12, wherein the receiving, by a second device, a first reference signal and a second reference signal by using a same antenna port and a same resource comprises:
   receiving, by the second device, the first reference signal and the second reference signal by using the same antenna port, the same resource, and a same beam set.

18. The reference signal receiving method according to claim 17, wherein the receiving, by the second device, the first reference signal and the second reference signal by using the same antenna port, the same resource, and a same beam set comprises:
   receiving, by the second device, the first reference signal and the second reference signal based on a same beam receiving sequence by using the same antenna port, the same resource, and the same beam set.

19. A reference signal sending method, comprising:
   generating, by a first device, a first reference signal based on a first sequence;
   generating, by the first device, a second reference signal based on a second sequence, wherein the first sequence and the second sequence are complementary sequences; and
   sending, by the first device, the first reference signal and the second reference signal by using a same antenna port and a same resource, wherein:
      a quantity M of subcarriers spaced between any two adjacent target subcarriers satisfies $M=3\times 2^T-1$, and T is a positive integer or zero; and
      a target subcarrier comprises subcarriers that are in one resource block and that are used to carry the first reference signal and the second reference signal.

* * * * *

UNITED STATES PATENT AND TRADEMARK OFFICE
CERTIFICATE OF CORRECTION

PATENT NO. : 12,107,787 B2
APPLICATION NO. : 17/506877
DATED : October 1, 2024
INVENTOR(S) : Fengwei Liu and Lei Chen Page 1 of 1

It is certified that error appears in the above-identified patent and that said Letters Patent is hereby corrected as shown below:

In the Claims

In Column 38, In Line 54 (Approx.), In Claim 19, delete "Tis" and insert -- T is --.

Signed and Sealed this
Fourth Day of February, 2025

Coke Morgan Stewart
*Acting Director of the United States Patent and Trademark Office*